(12) United States Patent
Lessig et al.

(10) Patent No.: US 10,475,238 B2
(45) Date of Patent: Nov. 12, 2019

(54) HÖLDER ADAPTIVE IMAGE SYNTHESIS

(71) Applicant: Technische Universitat Berlin, Berlin (DE)

(72) Inventors: Christian Lessig, Berlin (DE); Eugene Fiume, Burnaby (CA)

(73) Assignees: UNIVERSITY OF TORONTO, Toronto (CA); Technische Universität Berlin, Berlin (DE)

( * ) Notice: Subject to any disclaimer, the term of this patent is extended or adjusted under 35 U.S.C. 154(b) by 0 days.

(21) Appl. No.: 15/658,358

(22) Filed: Jul. 24, 2017

(65) Prior Publication Data
US 2018/0025535 A1    Jan. 25, 2018

Related U.S. Application Data

(60) Provisional application No. 62/366,136, filed on Jul. 25, 2016.

(51) Int. Cl.
*G06T 15/50* (2011.01)
*A63F 13/52* (2014.01)

(52) U.S. Cl.
CPC .......... *G06T 15/506* (2013.01); *A63F 13/52* (2014.09); *G06T 2215/16* (2013.01)

(58) Field of Classification Search
CPC ..... G06T 15/506; G06T 2215/16; A63F 13/52
See application file for complete search history.

(56) References Cited

U.S. PATENT DOCUMENTS

| | | | | |
|---|---|---|---|---|
| 2009/0122073 A1* | 5/2009 | Higgins | ............... | G09G 3/2003 345/590 |
| 2012/0299914 A1* | 11/2012 | Kilpatrick | ............... | G06T 15/50 345/420 |
| 2013/0343648 A1* | 12/2013 | Sato | ........................ | G06T 9/004 382/166 |

* cited by examiner

*Primary Examiner* — Saptarshi Mazumder
(74) *Attorney, Agent, or Firm* — AEON Law, PLLC; Adam L. K. Philipp; Martin S. Garthwaite

(57) ABSTRACT

Computer implemented method for rendering an image of a three-dimensional scene on an image plane by encoding at least a luminosity in the image plane by a luminosity function. The value of the luminosity can be computed at substantially each point of the image plane by using a set of stored input data describing the scene. The method includes constructing the luminosity function as equivalent to a first linear combination involving the functions of a first set of functions, and computing at least the value of the coefficients of the first linear combination, by solving a first linear system, obtained by using at least the functions of the first linear combination, at least a subset of the first subset of the image plane, and the luminosity at the points of said subset. The method further includes storing the value of the coefficients of the first linear combination and at least the information needed to associate each coefficient to the function multiplying said coefficient in the first linear combination. The first set of functions comprises each function of a second set of functions satisfying a selection condition, which depends at least on the set of stored input data. Moreover, the points of the first subset are distributed according to a first distribution criterion, which depends on the location of the support of at least a function of the first set of functions.

20 Claims, 4 Drawing Sheets

HÖLDER ADAPTIVE IMAGE SYNTHESIS

CROSS-REFERENCE TO RELATED APPLICATION

This application claims priority to U.S. Provisional Application No. 62/366,136 filed on 25 Jul. 2016. The entire contents of the above-mentioned application is incorporated herein by reference.

FIELD OF THE INVENTION

The present invention is directed to computer graphics, in particular to the technical field of three-dimensional computer graphics. More particularly, the present invention relates to a computer-implemented method for rendering an image of a three-dimensional scene.

BACKGROUND OF THE INVENTION

The generation of synthetic images of a three-dimensional scene is of importance in many applications e.g. in movie production, computer games, and computer-aided design and manufacturing processes. In particular, computer-implemented methods for rendering, storing, and/or reproducing an image of a three-dimensional scene, even of a simulated one, is of importance in many industrial applications, since e.g. they may be applied in investigating properties of an object and/or in designing an industrial article.

The prior art provides computer-implemented methods for image rendering, which comprise a process to sample the luminosity of the light impinging on the image plane and coming from the three-dimensional scene. Typically, the prior art of the present invention comprises either adaptive or non-adaptive sampling processes. Moreover the methods according to the prior art comprise a reconstruction process, which uses the luminosity samples generated by the sampling process to reconstruct the luminosity of the light impinging on the image plane.

The non-adaptive sampling processes of the prior art methods are based on a fixed, pre-determined sampling density, which does not take into account the actual features of the three-dimensional scene, and thus leads to a relatively inaccurate rendering of the image or require substantial computation time to obtain an image with few or new artefacts. Moreover, said sampling processes are typically based on the theory of Monte Carlo and/or Quasi Monte Carlo integration, which has been developed for integration problems and which was not conceived and only partially adapted to the problem of finding an approximated reconstruction of a continuous signal, e.g. of the luminosity of the light impinging on the image plane.

The adaptive sampling processes of the prior art methods, instead, are based on a sampling density that is successively refined by using the information about the image signal that is available at every stage of the computation. More specifically, said processes are able to determine the regions of the image plane requiring either a relatively high or a relatively low amount of samples and to adapt the sampling density accordingly. Such sampling processes, however, are not able to quantitatively determine the minimum number of samples said regions require, and thus they are not able to guarantee the reliability of the sample density they are based on.

The reconstruction processes of the prior art methods provide a representation of the luminosity of the light impinging on the image plane by assigning a luminosity and/or a colour value to each pixel of the given set of pixels composing the image. Said representation is obtained for a given rasterisation of the image, i.e. for a given number and/or a given location of the pixels rasterising the image. Therefore said representation is unsuitable for different rasterisations: if e.g. higher resolutions are needed, the sampling and the reconstruction procedures have to be repeated.

Moreover, the number of samples needed by said reconstruction processes is typically proportional to the number of pixels rasterising the image, number which scales steeply as the resolution of the image increase. This aspect strongly limits the resolution, which the images rendered by means of the prior art methods may attain.

Furthermore, the sampling process and the reconstruction process of the prior art methods are stand alone and are neither designed nor optimised to work together, e.g. the sampling density used in the former process is not chosen taking into account how the latter process performs the reconstruction. This strongly limits the efficiency and/or the reliability of the prior art methods.

Finally, the methods provided in the prior art do not allow for a quantitative assessment of the error associated to the reconstruction of the luminosity, for an estimation of the efficiency of said reconstruction, and/or for an evaluation of the computational effort needed to guarantee a given level of accuracy for the rendering of the image.

SUMMARY OF THE INVENTION

These problems are at least partially solved by the invention of the present application, which relates to a computer-implemented method according to claim 1. Embodiments of the invention are subject matter of the dependent claims. In particular, the present invention provides a computer-implemented method using a set of samplings in the image plane and the values of the luminosity at said samplings to provide a continuous representation of the luminosity of the light impinging on the image plane.

The present invention concerns a computer-implemented method for rendering at least partially an image of a three-dimensional scene on an image plane by encoding at least a luminosity in the image plane by a luminosity function defined on the image plane. The value of the luminosity can be computed at substantially each point of the image plane by using a set of stored input data describing the scene at least in part.

In particular, the method reconstructs the luminosity of the light impinging on the image plane by constructing the luminosity function encoding said luminosity. The luminosity function is a representation of the luminosity in the image plane and an approximation of the functional expression of the luminosity. The functional expression of the luminosity is in particular a function that associates to substantially each point of the image plane the exact value of the luminosity at said point and is thus impossible to compute in practice, since it requires an infinity of measurements of the luminosity impinging on the image plane.

The three-dimensional scene may comprise real and/or virtual objects and may be illuminated by virtual and/or real light sources. The set of stored input data may comprise in particular data specifying the geometry (e.g. the curvature), the texture, and the shading properties (e.g. reflection and refraction properties) of the objects of the three-dimensional scene and possibly other information relevant to assess said properties. Moreover, the stored input data may contain information specifying the lighting of the scene, e.g. the position, the intensity, and/or the spectrum of the light sources. For instance, the stored input data may serve as parameters for a rendering equation defined on the scene manifold, e.g. on the union of the surfaces of the objects of the scene. The rendering equation may in particular allow for computing the luminosity at the points of the image plane.

The image plane may be a two-dimensional surface, in particular a part of a plane, onto which at least part of the image, in particular the entire image is rendered. At least a part of the image plane, in particular the entire image plane, may admit a coordinate map and thus may be parameterised by two coordinates. For example, if the image plane is a rectangle and/or a square, one can parameterise its points by using two Cartesian coordinates ranging from 0 to 1.

The luminosity at a point, in particular at a point of the image plane, may be the intensity, the radiance, or the energy density of the light at said point. In particular, the luminosity may be the intensity, the radiance, or the energy density of the light with a given wavelength. For example, the luminosity is the intensity, the radiance, or the energy density of the light corresponding to one of the three RGB and/or to one of the four CMYK color channels at said point. The three RGB color channels are in particular the colors red, green, and blue, which allows for the reconstruction of the color according to the RGB color model. Moreover, the four CMYK color channels are in particular the colors cyan, magenta, yellow, and black, which allows for the reconstruction of the color according to the CMYK color model. In particular, the luminosity corresponding to one of the aforementioned color is given by the weighted sum of the luminosity at the various wavelengths, wherein for instance the weights are bigger for wavelengths close to the actual wavelength of the color.

A function defined on an element of a collection may in particular associate a number to said element. Moreover, a function defined on a collection of elements, e.g. the image plane or the scene manifold, is in particular a function defined almost everywhere on said collection, e.g. the element of the collection in which the function is not defined is a set of measure zero, in particular of measure zero according to the Lebesgue measure.

Two functions defined on the image plane are in particular equivalent to each other if they are equal almost everywhere in the image plane, e.g. the set of points of the image plane in which the two function are different is a set of measure zero, in particular of measure zero according to the Lebesgue measure.

The method according to the present invention comprises at least the steps of:
a) constructing the luminosity function in at least a region of the image plane as equivalent to, in particular equal to, a first linear combination involving the functions of at least a subset of a first set of functions defined on at least the region of the image plane, in particular on the image plane;
b) computing the value of the coefficients of the first linear combination, by solving a first linear system, which is obtained by imposing the value of a second linear combination at each point of at least a subset, S, of the first subset of the image plane to be substantially equal to the value of the luminosity at said point; and
c) storing the value of the coefficients of the second linear combination, which are comprised in the first linear combination and at least the information needed to associate each coefficient of the first linear combination to a corresponding function, which is the function multiplying said coefficient in the first linear combination and e.g. belongs to the first set of functions.

Through the present specification, the steps of the method according to the present invention are labelled by letters of the Latin alphabet. The alphabetical order of said letters, however, does not necessarily reflects the chronological order of the steps according to the present invention.

The luminosity function in a first generic region of the image plane is in particular the luminosity function restricted to a second generic region, wherein said second generic region comprises at least said first generic region and/or is equal to said first generic region. Similarly, the functional expression of the luminosity in said first generic region of the image plane is in particular the functional expression of the luminosity restricted to said second generic region.

The first linear combination is in particular a function defined at least on the region of the image plane, in particular on the image plane. If the function involved in the first linear combination are $M_1$ functions denoted as $f_1, f_2, \ldots, f_{M_1}$, the first linear combination, $L_{C1}$, may be written in terms of $M_1$ coefficients $C_1, C_2, \ldots, C_{M_1}$, as follows:

$$L_{C1}(u) = \sum_{i=1}^{M_1} C_i f_i(u), \quad (I)$$

wherein u is a n-tuple, in particular a two-dimensional n-tuple, specifying the coordinates of a generic point of the region of the image plane.

The functional expression of the luminosity and thus the luminosity function may have to fulfill requirements concerning their regularity, e.g. the way they vary on the image plane. Said requirements are dictated by the physical properties of the electromagnetic radiation and/or by the features of the three-dimensional scene and thus of the image of the scene.

In particular, the functional expression of the luminosity and thus the luminosity function are Lipschitz in the image plane, and/or are $\alpha$-Lipschitz in the image plane, for at least a positive number $\alpha$. Moreover, in the case of natural images including textures, the functional expression of the luminosity and thus the luminosity function may be bounded functions and/or a piecewise smooth functions.

A function $\check{f}$ defined on the image plane, e.g. the luminosity function, is in particular Lipschitz in a generic region of the image plane if for each point of said generic region said function, e.g. the luminosity function, is $\alpha_{\check{u}}$-Lipschitz at said point for at least a positive number $\alpha_{\check{u}}$, wherein $\alpha_{\check{u}}$, is the Lipschitz exponent of the function $\check{f}$, e.g. of the luminosity function, at the point, $\check{u}$ is a n-tuple, e.g. a two-dimensional n-tuple, specifying the coordinates of the point.

In particular, the function $\check{f}$, e.g. the functional expression of the luminosity or the luminosity function, is $\alpha_{\check{u}}$-Lipschitz at the point with coordinates $\check{u}$ if there exists a positive constant, and a polynomial function, $p_{\check{u}}$, of degree equal to the integer part of $\alpha_{\check{u}}$, such that for each point (with coordinates u) of a neighbourhood of the point with coordinates $\check{u}$ the following condition holds:

$$\left| \check{f}(u) - p_{\check{u}}(u) \right| \leq \Gamma_{\check{u}} \| u - \check{u} \|^{\alpha_{\check{u}}}, \quad (II)$$

wherein the symbol "∥ ∥" denotes the two-dimensional Euclidean norm. A neighbourhood of a generic point of the image plane is a set, e.g. an open set, of the image plane containing said generic point.

In particular, the Lipschitz exponent at a generic point is related to the regularity of said function, e.g. of the functional expression of the luminosity or of the luminosity function, at said generic point. In particular, the larger the Lipschitz exponent at a generic point of the image plane the more regular is said function, e.g. the functional expression of the luminosity or the luminosity function, at said generic point.

For example, if said function, e.g. the functional expression of the luminosity or the luminosity function, is twice differentiable at a generic point of the image plane, the Lipschitz exponent at said point is at least two. Moreover, if said function, e.g. the functional expression of the luminosity or the luminosity function, is discontinuous at a generic point of the image plane the Lipschitz exponent at said point vanishes. Further, if the Lipschitz exponent is smaller than one at a generic point said function, e.g. the functional expression of the luminosity or the luminosity function, is non-differentiable at said generic point.

For at least a positive number $\breve{\alpha}$, function, e.g. the functional expression of the luminosity or the luminosity function, is in particular $\breve{\alpha}$-Lipschitz in a generic region of the image plane if it is $\breve{\alpha}$-Lipschitz in each point of said generic region. The number a is the Lipschitz exponent of said function, e.g. of the functional expression of the luminosity or of the luminosity function, in the generic region of the image plane.

Moreover, a generic function $\hat{f}$, e.g. the functional expression of the luminosity or the luminosity function, is bounded in a generic region of the image plane if $\sup(\hat{f}) < \infty$ and $\int |\nabla \hat{f}(u)| d^2 u < \infty$, wherein both the supremum and the integral are calculated over said generic region of the image plane.

The first set of functions comprises each function of a second set of functions satisfying a selection condition associated to said function. The selection condition associated to said function depends at least on said function and on the set of stored input data.

The second linear combination involves at least the terms of the first linear combination and may in particular be equal to the first linear combination. In particular, the second linear combination may involve at least functions belonging to the first set of functions and/or to the second set of functions.

If the function involved in the second linear combination are $M_2$ functions denoted as $f_1, f_2, \ldots, f_{M_2}$, with $M_1 \le M_2$, the second linear combination, $L_{C2}$, may be written in terms of $M_2$ coefficients $C_1, C_2, \ldots, C_{M_2}$, as follows:

$$L_{C2}(u) = \sum_{i=1}^{M_2} C_i f_i(u), \quad \text{(III)}$$

wherein u is an n-tuple, in particular a two-dimensional n-tuple, specifying the coordinates of a generic point of the region of the image plane. If $M_1 = M_2$ the first linear combination is equal to the second linear combination. Moreover, if $M_1 < M_2$, the second linear combination may be expressed as follows:

$$L_{C2}(u) = L_{C1}(u) + \sum_{i=M_1+1}^{M_2} C_i f_i(u). \quad \text{(IV)}$$

The subset S may be a subset of the region of the image plane and may comprises N points with coordinates $u_1, u_2, \ldots, u_N$. In this case, the first linear system comprises N equations and reads as follows:

$$\begin{cases} \sum_{i=1}^{M_3} C_i f_i(u_1) = l_1 \\ \sum_{i=1}^{M_3} C_i f_i(u_2) = l_2 \\ \vdots \\ \sum_{i=1}^{M_3} C_i f_i(u_N) = l_N \end{cases} \quad \text{(V)}$$

wherein the coefficients $C_1, C_2, \ldots, C_{M_2}$, are the variables of the first linear system and $l_1, l_2, \ldots, l_N$ are the luminosity samples. More specifically, $l_j$ is the value of the luminosity at the point with coordinates $u_j$, wherein the index j may represent any positive integer smaller than or equal to N. The luminosity samples are for instance computed by using ray tracing and/or ray casting.

The solution of the first linear system may also be an approximate solution, in particular if the system is overdetermined. Moreover, the system is also deemed to be solved if the value of the coefficients of only a proper subset of the set of the coefficients of the second linear combination has been computed, insofar as said subset contains at least the coefficients of the first linear combination. This may be achieved if e.g. the matrix associated the first linear system is block diagonal, even if the block-diagonal structure becomes apparent after an appropriate shuffling of the rows and/or of the columns.

The points of the first subset are distributed according to a first distribution criterion, wherein the first distribution criterion may for instance depend on the luminosity of the light impinging on the image plane and/or on the properties of the elements of the first set of functions. More specifically the first distribution criterion depends on at least the location of the support of at least some of the elements of the first set of functions on the image plane. In particular, the distribution criterion may allow for computing the coefficients of the first linear combination via the first linear system e.g. by distributing the points of the first subset and thus the luminosity samples in such a way that a sufficient number of points of the first subset belong to the support of the functions, which said coefficients multiply in the first linear combination, so that e.g. the linear system has exactly one solution or is overdetermined.

The value of at least a first coefficient of the first linear combination and the information needed to associate the first coefficient of the first linear combination to a first function, which is the corresponding function of the first coefficient, may be stored on a storage device such as the memory of a computer (in particular of the computer on which the method is implemented), a secondary storage device such as hard disks, optical discs (e.g. CD or DVD), flash memory (e.g. USB flash drives), floppy disks, standalone RAM disks and the like. Moreover, the value of the first coefficient and the information needed to associate said coefficient to the first function may be stored according to a data storage model such as the Cloud storage or the Nearline storage model.

For example, the information needed to associate the first coefficient to the first function may be stored by assigning a label to the functions of the first set of functions and by creating a table having entries specifying the first coefficient and the label associated to the first function. Said table may also store information concerning the luminosity encoded by the luminosity function, such as the wavelength and/or of the color of the light the luminosity belongs to. Any structure or format may be used to associate the first coefficient and the first function, insofar as the information can be reliably retrieved and interpreted correctly.

The information needed to compute at least the value of at least the functions of the first and/or of the second linear combination, at substantially each point of the region of the image plane may be stored in a storage device. For instance, this information comprises at least a multidimensional grid comprising the pointwise values of at least a function of the first and/or of the second linear combination. The value of said function at substantially each point of the image plane is thus obtained by using an interpolation procedure. Alternatively or in conjunction, said information may comprise electronic instructions encoding at least a function of the first and/or of the second linear combination.

The luminosity function computed according to the present invention is a continuous representation of the luminosity of the light impinging on at least the region of the image plane, e.g. a function (not necessarily continuous), which allows for computing the luminosity at substantially each point of at least the region of the image plane. More particularly, it is a function (not necessarily continuous), which is defined almost everywhere on at least the region of the image plane.

The method may not rely on any information concerning the image resolution and thus the luminosity function may be used for obtaining several rasterisations of the image, wherein said rasterisations can differ from each other at least in the image resolution.

The selection condition depends on the set of stored input data, i.e. on the data describing the three-dimensional scene. Therefore, the functions of the first linear combination fulfil selection conditions, which depend on the features of the three-dimensional scene. This improves the quality of the reconstruction of the luminosity of the light impinging on region and thus on the image plane.

Moreover, the first distribution criterion depends on the properties of the elements of the first set of functions, e.g. on the location of the support of said elements, which enter in the reconstruction of the luminosity function. Therefore, the location of the luminosity samples is determined by taking into account how the reconstruction of the luminosity is performed by the method according to the present invention.

Furthermore the distribution of the points of the first subset ultimately depends on the features of the three-dimensional scene, since it depends on the location of the support of the functions fulfilling the first selection condition. As already mentioned, this may improve the quality of the reconstruction of the luminosity and thus of the rendering of the image.

The computation of the luminosity function is obtained by solving a first linear system, a task which can be efficiently performed by using known numerical methods. Said methods lead to well-understood, quantifiable numerical errors, which allow for an (at least partial) assessment of the error affecting the reconstruction of the luminosity of the light impinging on the image plane. Moreover, the error arising from the solution of the first linear system can be easily reduced by e.g. oversampling the luminosity samples, i.e. by increasing the number of the luminosity samples entering in the first linear system.

Embodiments of the present invention make use of mathematical techniques allowing for the optimization of the number of samplings and/or for the maximisation of the accuracy of the rendering of the image.

In an exemplary embodiment of the present invention, the value of each coefficient of the second linear combination, which is not comprised in the first linear combination, is smaller than each coefficient of the second linear combination, which is comprised in the first linear combination.

In an embodiment of the present invention, the first linear system is solved by using a least squares fit, in particular the linear least squares fit, and/or by using an interpolation fit, e.g. by using a generalised Vandermonde matrix.

The number of the luminosity samples needed by the method according to the present invention scales much slower than the number of pixels rasterising the image, which allows for rendering images having relatively high resolution with a relatively limited computational effort.

In particular, the linear least squares fit allows for obtaining the coefficients of the first linear combination as part of an approximated solution of the first linear system. Said solution is obtained by minimising with respect to the coefficients of the second linear combinations the sum of the squared differences between the left-hand side and the right-hand side of the equations of the first linear system, cf. equation (V). In particular, the to-be-minimised sum is given by $$\sum_{j=1}^{N}\left(\sum_{i=1}^{M_2} C_i f_i(u_j) - l_j\right)^2. \qquad (\text{VI})$$

Least squares fits provides an accurate approximation of the solution of the first linear system and thus of the value of the coefficients of the first linear combination. Moreover, said solution is relatively robust with respect to small inaccuracies that can be introduced when constructing e.g. by sampling the first subset of the image plane. Least squares fits are particularly suitable if the first linear system is overdetermined.

Interpolation fits are simple and reliable methods, which allow for obtaining the values of the coefficients of the first linear combination as part of the mathematically exact solution of the first linear system. Said solution is mathematically exact since it is obtained by requiring that the solution fulfils the conditions of the first linear system. A mathematically exact solution may, however, be affected by numerical error related e.g. by the (numerical) method used to obtain it.

In a further embodiment of the present invention, for at least a function of the second set of functions the selection condition associated to said function depends on the value of the luminosity at at least one point of the support of said function.

In particular, the luminosity at said point may be computed by using the set of stored input data. In this case, said selection condition may depend only indirectly on the set of stored input data, i.e. only through the dependence of the luminosity and e.g. of the information derived from it (such as the numerical or the analytical gradient) on the set of stored input data.

In this case, the dependence of the first selection condition on the features of the three-dimensional scene is encoded in the luminosity, which provides a physically meaningful, easy-to-manipulate, and easy-to-interpret information on the features of the three-dimensional scene.

In an exemplary embodiment of the method of the present invention, the image plane is tiled by a given first set of tiles.

In particular, a set of tiles is a collection of mutually disjoint open sets comprised in the image plane, the closures of which cover the image plane. Moreover a set of tiles may be a partition of the image plane, i.e. a collection of mutually disjoint subsets of the image plane, the union of which is the image plane itself. The first set of tiles may in particular correspond to a set of pixels constituting a rasterisation of the image.

The information needed to describe each tile of the first set of tiles may be stored on a storage device, and/or according to a data storage model such as the Cloud storage or the Nearline storage model. The information needed to describe each tile of the first plurality depend on the tile itself and should guarantee the possibility to unambiguously assess whether a point of the image plane belongs to said tile.

For instance, if a tile of the first set of tiles is a circle, said information may comprise the position of its center and the length of its radius. If said tile is a rectangle and/or a square, said information may comprise at least the position of its center and the position of two adjacent edges of its boundary. Said information may also be one or a plurality of conditions, which unambiguously characterise the points of said tile.

Moreover, the first distribution criterion comprises at least the requirement that for at least a first tile e.g. for substantially each tile, of the first set of tiles the number of points of the first subset belonging to said tile depends on the number of functions of the first set of functions, the support of which overlaps said tile. In particular, the former number may increase as the latter number increases. Therefore, the first distribution criterion regulates the number of points of the first subset, which are comprised in the first tile, e.g. in substantially each tile, of the first set of tiles.

The number of functions of the first set, the support of which overlaps the first tile, is in particular the number of functions that, according to the first selection condition, need to be used to satisfactorily reconstruct the luminosity impinging on said tile. Therefore, said number reflects the local features of the luminosity and thus the local features of the image of the three-dimensional scene.

In this case, the first distribution criterion allows for distributing the points of the first subset, and thus the luminosity samples, according to the number of functions needed for a satisfactory reconstruction of the luminosity impinging on the first tile. This may allow for distributing the luminosity samples according to the local features of the luminosity and therefore to improve the reconstruction of the luminosity impinging on at least the region of the image plane and thus of the image of the three-dimensional scene.

In an embodiment of the method according to the present invention substantially each function, e.g. each function, of the first set of functions is associated to a weight factor. In particular substantially each function, e.g. each function, of the second set of functions may be associated to a weight factor. The weight factor associated to a function may for instance be an indication of the importance that said function may have in the reconstruction of the luminosity, e.g. of the numerical relevance of said function and/or of the coefficient associated thereto. In particular, said importance depends on the features of the three-dimensional scene and may be estimated e.g. by using the set of stored input data. In particular, the weight factor may be a non-negative number, e.g. a number comprised between zero and one.

The first distribution criterion may comprise at least the requirement that for at least the first tile e.g. for substantially each tile of the first set of tiles the number of points of the first subset belonging to said tile is greater than or equal to a first total weight factor. In particular, the first total weight factor is the sum of the weight factors of the functions of the first set of functions, the support of which overlaps said tile.

The first total weight factor increases as the number of functions of the first set, the support of which overlaps said tile, increases, i.e. as the number of functions that, according to the first selection condition, need to be used to satisfactorily reconstruct the luminosity impinging on said tile. Moreover the first total weight factor increases as the weight of the functions, the support of which overlaps said tile, increases, i.e. as the importance of the functions needed to satisfactorily reconstruct the luminosity impinging on said tile increases. Therefore, said number may be considered to be a lower bound encoding the local features of the luminosity and thus the local features of the image of the three-dimensional scene.

In this case, the first distribution criterion allows for distributing the points of the first subset, and thus the luminosity samples, according to the number of functions needed for a satisfactory reconstruction of the luminosity impinging on said tile and according to the importance of said functions. This may allow for distributing the luminosity samples according to the local features of the luminosity and to the importance of the functions entering in the first linear combination. This will improve the reconstruction of the luminosity impinging on the image plane and thus of the image of the three-dimensional scene. Furthermore, the first distribution criterion provides a lower bound on the number of luminosity samples needed to obtain a satisfactory reconstruction of the luminosity of the light impinging on said tile.

Alternatively or in conjunction, the first distribution criterion may comprise at least the requirement that for at least the first tile, e.g. for substantially each tile, of the first set of tiles the number of points of the first subset belonging to said tile is greater than or equal to the product between a first factor and the first total weight factor. The first factor may be greater than or equal to one.

The first factor allows for improving the quality of the reconstruction by increasing the numerical stability of the solution of the first linear system as well as the robustness of said solution with respect to small inaccuracies that can be introduced when constructing e.g. by sampling the first subset of the image plane. In particular, this is achieved since the first linear system is an overdetermined system, which e.g. may be solved by using least square fits.

Moreover, this embodiment of the method according to the present invention allows for a quantitative assessment of the minimum number of luminosity samples, which are needed for a satisfactory reconstruction of the luminosity in at least part of the image plane.

In particular, the weight factor of at least a function of the first set of functions may be proportional to the inverse of the number of elements of the first set of tiles the support of said function overlaps.

In this embodiment, the weight of said function allows for avoiding any unnecessary oversampling of the image plane, since on average said function will lead to one single luminosity sample, which is indeed sufficient to compute the value of the coefficient of said function in the first linear combination. Said oversampling would increase the computational load needed to carry out the method. Further, it would increase the size of the memory space required by the method and thus complicate the memory management of implementing the method in a computer.

Moreover, the luminosity samples needed by the method according to the present invention scales much slower than the number of pixels rasterising the image, which allows for rendering images having relatively high resolution with a relatively limited computational effort.

An embodiment of the method according to the present invention further comprises the step of:
d) constructing the first set of functions by selecting each function of the second set of functions satisfying the selection condition associated to said function.

Alternatively or in conjunction, the method of the present invention further comprises the step of:
e) storing the information needed to describe the region and/or the information needed to associate at least a second coefficient, e.g. all the coefficients, of the first linear combination to the region.

Said information may for instance be stored in a storage device and/or according to a data storage model such as the Cloud storage or the Nearline storage model.

The information needed to describe the region may in general depend on the region itself and should guarantee the possibility to unambiguously assess whether a point of the image plane belongs to the region. For instance, if the region is a circle said information may comprise the position of its center and the length of its radius. If the region is a rectangle and/or a square, said information may comprise at least the position of its center and the position of two adjacent edges of its boundary. Said information may also be one or a plurality of conditions, which unambiguously characterise the points of the region.

The information needed to associate the second coefficient to the region may be stored by assigning a label to the region and by creating a table having entries specifying the second coefficient and the label associated to the region. Said table may also comprise the label associated to a second function, which is to the function multiplying the second coefficient in the first linear combination. Any structure or format may be used to associate the first coefficient and the region, insofar as the information can be reliably retrieved and interpreted correctly.

In this case, the information stored in the storage device allows for reproducing the reconstruction of the luminosity of the light impinging on the region. Therefore, the part of the image in the region of the image plane may be stored according to a first storage procedure, which uses the aforementioned information. The first storage procedure requires a relative small size of the memory space and thus the impact of the first storage procedure on the memory management of the storage device is relatively limited, which allows for streamlining the exchange of images.

Moreover, this embodiment allow for a local reconstruction of the luminosity, i.e. for a reconstruction of the luminosity of the light impinging on the region of the image plane. Such local reconstruction is relatively efficient in providing a satisfactory faithful representation of the luminosity, and thus increases the reliability of the reconstruction.

Further, this embodiment allows for splitting the image plane in several mutually disjoint regions, wherein the reconstruction of luminosity impinging on one generic region of said regions is achieved by applying the method according to the present invention to said regions. Therefore, the reconstruction processes of the light impinging on these regions may be easily parallelized, since the reconstruction of the luminosity impinging thereon is local. This allows for an optimization of all the computational resources at hand, which streamline the reconstruction of the image.

In an embodiment of the method according to the present invention, the value of the luminosity can be computed at substantially each point of the image plane via a rendering equation based on at least a part of the set of stored input data describing at least partially the scene.

In particular, the rendering equation is an integral equation, the kernel of which is equal, equivalent, and/or proportional to a function which is equivalent to a scattering function defined on the scene manifold, e.g. on the union of the surfaces of the objects of the scene. The scattering function may be comprised in the set of stored input data and may be obtained by using an interpolation procedure interpolating a multidimensional grid comprising pointwise values of said scattering function. Alternatively, the stored input data may comprise electronic instructions encoding the scattering function.

As known in the prior art, the rendering equation may for instance allow for computing the spatial luminosity function, $\check{L}$, wherein $\check{L}(\check{x}, \omega')$ represents the luminosity at a generic surface point with spatial coordinates $\vec{x}$ in the generic direction $\omega$. In this case, the rendering equation may be expressed as follows:

$$\hat{L}(\vec{x},\omega) = \hat{L}_0(\vec{x},\omega) + \int \hat{L}(\tau(\vec{x},\omega'),\omega') \rho(\vec{x},\omega,\omega') d\omega', \quad (VII)$$

wherein $\hat{L}_0(\vec{x},\omega)$ represents the emitted luminosity in the generic surface point with spatial coordinates $\vec{x}$ in the generic direction $\omega$. Moreover, $\tau(\vec{x},\omega')$ is the ray tracing function which determines the closest surface point from the generic surface point with spatial coordinates $\vec{x}$ in the generic direction $\omega'$. Furthermore, $\rho(\vec{x},\omega,\omega')$ is the scattering function. The integral in equation (VII) is performed over all the directions belonging to a local hemisphere, wherein the local hemisphere is constructed over the point with spatial coordinates $\vec{x}$.

The spatial coordinates $\vec{x}$ of a generic surface point of the three-dimensional space may for instance be the three-dimensional Cartesian coordinates of said generic surface point. Moreover, the generic direction $\omega$ and/or $\omega'$ may be uniquely determined by a three-dimensional unit-vector and/or by two angles, e.g. the azimuthal and the polar angle of a spherical coordinate system.

For example, the rendering equation may be computed by iteration. In particular, the first order approximation of the solution of the rendering equation considers only the first bounce of the light between the light source and the image plane.

The spatial luminosity function may be used to calculate the luminosity at a generic point of the image plane, e.g. by means of ray tracing. For instance, for a pinhole camera if the light propagates in a medium with homogenous refractive index the transport map is trivial and the luminosity $l_u$ in the generic point of the image plane with coordinates u is given by:

$$l_u = \hat{L}(\vec{x}_u + s_u \vec{e}_u, -\vec{e}_u), \quad (VIII)$$

wherein $\vec{x}_u$ are the spatial coordinates of the generic point of the image plane and $\vec{e}_u$ is the unit length direction vector of the ray passing through the generic point from the camera position. Moreover, $s_u$ is the distance between the generic point and the first intersection point between the scene manifold and the ray impinging on the generic point.

The rendering equation is a physically motivated equation, which allows for computing the luminosity of the light impinging on the image plane and coming from the three-dimensional scene in an objective, systematic, reproducible, and verifiable way. Moreover, said equation may allow for obtaining the luminosity of the light coming from the three-dimensional scene by a well defined computational procedure reproducing a direct measurement.

In an embodiment of the present invention, the support of at least a function of the second set of functions is local, i.e. is a proper subset of the image plane.

This renders the matrix associated to the first linear system sparse, which allows for splitting the matrix associated to the first linear system into partially overlapping windows, wherein the systems associated to said windows may be solved independently from each other The computation of the solution of all the systems associated to the windows requires less computational resources than the computation of the solution of the first linear system, since the complexity of the problem of finding the solution of a linear system scales polynomial with the size of the linear system itself, wherein the exponent of such polynomial scaling is greater than one. Therefore, this embodiment allows for increasing the speed of the algorithm, since the computation of the solution of all the systems associated to the windows requires less computational resources than the solution of the first linear system.

A further increase of the speed of the algorithm may be e.g. by parallelising the solution of the system associated to the windows. Alternatively or in conjunction, the embodiment of the method according to the present invention allows for improving the reconstruction of the image, since the splitting of the first linear system into smaller systems allows for effectively solving relatively big systems, i.e. systems obtained by using a relative big amount (e.g. millions) of luminosity samplings, which cannot be solved or cannot be effectively solved by using standard computing hardware.

A proper subset of the image plane is in particular a subset such that its complement with respect to the image plane is not empty, e.g. said complement has a non-vanishing measure, in particular a non-vanishing measure according to the Lebesgue measure.

In another embodiment of the present invention, the method further comprises the step of:
f) constructing the first subset of the image plane by sampling the image plane according to the first distribution criterion.

For example, in this embodiment the first subset of the image plane may be constructed by defining a sampling distribution fulfilling the first distribution criterion and by sampling the image plane according to this sampling distribution.

Moreover, the first subset of the image plane may be constructed by using the first set of tiles and a first sampling procedure. According to the first sampling procedure, for at least a tile e.g. for substantially each tile of the first set of tiles a number of sampled points of said tile are sampled, in particular randomly sampled, wherein said number depends on the number of functions of the first set of functions, the support of which overlaps said tile. The first subset of the image plane is thus constituted by substantially all the sampled points obtained according to the first sampling procedure, e.g. the first subset is given by the union of all the sampled points sampled according to the first sampling procedure.

In particular, for at least a tile e.g. for substantially each tile of the first set of tiles the number of sampled points of the image plane is greater than or equal to the first total weight factor and/or the product between the first factor and the first total weight factor.

In an exemplary embodiment of the present invention, the second set of functions is at least a subset of a basis, e.g. a orthonormal basis, and/or of a frame of an inner product space. In particular, a suitable basis may provide quantitatively good approximation properties with respect to the physical properties of the luminosity of the light impinging the image plane, and thus of the features of the image of the three-dimensional scene. For example, such a basis is a set of wavelets, which, as described in the following, may provide a good approximation of piecewise smooth images.

For instance, the inner product space may be a set $V_1$ with a first inner product. In particular, the set $V_1$ is the space of those continuous, real-valued functions defined on the image plane for which the Lebesgue integral of the square of the function is finite. Moreover, for two functions $g_1$ and $g_2$ of $V_1$, the first inner product, $\{g_1,g_2\}$, is defined by $\{g_1,g_2\} \equiv \int g_1(u) g_2(u) d^2u$, wherein the integral is performed on the image plane.

The inner product space may in particular be a Hilbert space, e.g. it may be a set $V_2$ with the second inner product. In particular, the set $V_2$ is the space of those real-valued measurable functions defined on the image plane for which the Lebesgue integral of the square of the function is finite. Furthermore, or two functions $g_3$ and $g_4$ of $V_2$, the second inner product, $<g_3,g_4>$, is defined by $<g_3,g_4> \equiv \int g_3(u) g_4(u) d^2u$, wherein the integral is performed on the image plane. Moreover, the inner product space may be a Sobolev space comprising functions defined on the image plane.

The inner product space comprises functions defined on the image plane, e.g. it comprises the luminosity function. Moreover the inner product space is in particular a possibly infinite dimensional vector space with an inner product. The basis and/or the frame of the inner product space allow to associate each function of the inner product space, in particular the luminosity function, to a set of components associated to said function, wherein each component is paired to a function of the basis and/or of the frame by a first one-to-one correspondence.

The component of the set of components associated to a generic function of the inner product space, wherein said component is paired to a specified function by a first one-to-one correspondence, may in the following be denoted as the component of said generic function paired to said specified function by the one-to-one correspondence.

Moreover, each component of said set of components may be equal and/or proportional to the inner product between said function of the inner product space and the function of the basis and/or of the frame, which is paired to said component by the first one-to-one correspondence.

For instance, if the basis and/or the frame is the set $B_1=\{\varphi_{1,m}:m \in m_1\}$, wherein $m_1$ is a countable set of indices, the set of components associated to a generic function of the inner product space, is the set $C_f=\{a_{1,m}:m \in m_1\}$, wherein the elements of the set of components are determined by requiring that said generic function is equivalent to the linear combination $\Sigma_{m \in m_1}(\alpha_{1,m}\varphi_{1,m})$. In this case, the first one-to-one correspondence pairs the element $\varphi_{1,m_1}$ of the set $B_1$ with the element $a_{1,m_1}$ of the set $C_1$, for each $m_1 \in m_1$.

In this case, the functions of the first set of functions are comprised in a basis and/or in a frame of the inner product space and thus inherits at least in part the features of said basis and/or said frame. As a consequence, the first linear combination and/or the second linear combination acquire special mathematical properties, which may simplify the computation of the solution of the first linear system and/or reduce the scaling of the complexity of said computation. This would in particular allow for increasing the size of the first linear system, that is the number of the luminosity samples, and thus for improving the reconstruction of the image obtained by solving said first linear system.

Moreover, this embodiment allows for a quantitative, mathematically consistent formulation of the error affecting the reconstruction of the luminosity impinging on the image plane. In particular, said error, $\in$, is the norm, $\|\ \|_{IP}$, induced by the inner product of the difference between the luminosity function, $f_L$, and the functional expression, $f_{LT}$, of the luminosity, i.e. $\in = \|f_L - f_{LT}\|_{IP}$.

In particular, the basis and/or the frame is selected from a list comprising at least a set of wavelets, a set of shearlets, a set of curvelets, or combinations thereof.

A set of wavelets is in particular a set of functions, which are obtained from one or a plurality of mother functions defined on a subset of the image plane by translation and/or by contraction. A set of wavelet includes, for example, the two-dimensional Haar wavelets, the two-dimensional Daubechies wavelets, and/or the two-dimensional Cohen-Daubechies-Feauveau wavelets.

A set of wavelets may be an orthonormal basis, which may be constructed in compact domains. They are specifically designed for finite intervals, e.g. for the image plane, and thus may efficiently reconstruct the luminosity impinging on the image plane and may efficiently render the image, even at the boundaries of the image plane. Moreover, wavelets are typically easy to implement in a computer and/or to sample numerically, which may drastically reduce the computational load needed to carry out the method according to the present invention. Moreover, as discussed in the following, an appropriately chosen subset of a set of wavelets, e.g. the first set of functions, may lead to a quasi-optimal representation of an image, e.g. of a piecewise smooth image.

Moreover, a set of curvelets is in particular a set of functions, which are obtained from one or a plurality of mother functions defined on a subset of the image plane by rotation, by parabolic rescaling, and/or by translation.

Further, a set of shearlets is in particular a set of functions, which are obtained from one or a plurality of mother functions defined on a subset of the image plane by shearing, by parabolic rescaling, and/or by translation.

A set of shearlets and/or a set of curvelets are frames, which efficiently reconstruct images having anisotropic features therein. Moreover, as discussed in the following, an appropriately chosen subset of a set shearlets and/or a set of curvelets, e.g. the first set of functions, may lead to an optimal representation of an image, e.g. of a piecewise smooth image. In turn, this may reduce the number of luminosity samples that are required to obtain the representation of the luminosity impinging on the region of the image plane.

In a further embodiment of the present invention, the value of the coefficients of the first linear combination is computed by means of the reproducing kernel technique.

As known in the art, the reproducing kernel technique is in particular a technique, which allows for obtaining the coefficients of a linear combination by using the pointwise values of said linear combination through the so-called sampling matrix.

The aforementioned reproducing kernel technique is in particular performed with at least a first local set of functions of the first set of functions, at least the points of a first local subset of the first subset of the image plane and at least the value of the luminosity at the points of the first local subset of the first subset. The first local set and the first local subset may in particular coincide with the first set of functions and with the first subset of the image plane, respectively.

For instance, if the second linear combination and the first linear system are written according to equation (III) and equation (V), respectively, the generic coefficient $C_i$ is given by $$C_i = \sum_{j=1}^{N} SM_{ij} l_j,$$

wherein i is a positive integer smaller than or equal to $M_2$. The generic coefficient $C_i$ is expressed in terms of the sampling matrix SM with generic entry $$SM_{ij} = [f_i, \tilde{\kappa}_j],$$

wherein $f_1, f_2, \ldots, f_{M_n}$ are the function of the second linear combination written according to equation (V) and wherein i and j are positive integers smaller than or equal to $M_2$ and N, respectively. The square brackets "[,]" denote the inner product of the inner product space. The functions $\tilde{\kappa}_1, \tilde{\kappa}_2, \ldots, \tilde{\kappa}_N$ are defined on the image plane and constitute a dual frame or dual basis with respect to a basis frame. The basis frame is a set of functions, $\kappa_1, \kappa_2, \ldots, \kappa_N$, the generic element, $\kappa_j$, of which is given by $$\kappa_j(u) = \sum_{k=1}^{M_2} f_k(u_j) f_k(u),$$

wherein j is a positive integer smaller than or equal to N.

When the basis frame is a basis, the dual frame with respect to the basis frame may fulfill the biorthogonality condition $[\kappa_{j'}, \tilde{\kappa}_j] = \delta_{j'j}$, for each pair $(j,j')$ of positive integers smaller than or equal to N, wherein $\delta_{j'j}$ is the Kronecker delta. In this case, the sampling matrix is the inverse of the matrix associated to the first linear system.

The reproducing kernel technique employs constructive reproducing kernels for computing a continuous representation of the luminosity from pointwise luminosity samples. Said technique provides a rigorous mathematical formulation to connect pointwise values of a function and a basis or frame representation of the function itself. Inter alia, said technique improves the efficacy of the reconstruction of the image of a three-dimensional image, since it enables to use known information about the luminosity impinging on the region of the image plane in the reconstruction process.

Further, the reproducing kernel technique allows for quantitatively assessing the error affecting the reconstruction of the luminosity, which arises when the functional expression of the luminosity lies only approximately in the space generated by the first and/or the second set of functions, if e.g. the second set of functions is a subset of an infinite-dimensional base and/or of an infinite-dimensional frame of the inner product space.

Moreover, the reproducing kernel technique allows to quantitatively assess the quality of the reconstruction of the image by quantitatively assessing the quality of the luminosity samples associated to the first subset of the image plane e.g. by means of the rk-discrepancy associated to the first subset. This allows for evaluating the error affecting the reconstruction of the luminosity and/or for finding the points of the image plane leading to an optimal reconstruction. The rk-discrepancy associated to the first subset of the image plane is in particular the condition number of the matrix associated to the first linear system.

In particular, in a further embodiment of the present invention the first distribution criterion comprises at least the requirement that the rk-discrepancy of the first subset of the image plane is lower than or equal to a given discrepancy threshold, wherein the discrepancy threshold may be greater than or equal to one. Additionally or in conjunction, the discrepancy threshold may be lower than ten and/or lower than two.

In an embodiment of the present invention, the second set of functions is a hierarchical set of functions.

According to the present invention the elements of a hierarchical set of functions can be grouped into a first collection of mutually disjoint levels. Moreover, the elements of the first collection can be associated to a level parameter. The first collection may also be an infinite collection of mutually disjoint levels.

Moreover, in the case of a hierarchical set of functions, there is at least a decreasing bound function of the level parameter, which e.g. is defined at least on the set comprising all the level parameters associated to the elements of the first collection. For at least a function, e.g. for substantially each function, of said hierarchical set, the absolute value of the inner product between the luminosity function and said function of the hierarchical set is smaller than or equal to the value of the bound function evaluated at the value of the level parameter associated to the level, to which said function of said hierarchical set belongs.

In this embodiment, the method according to the present invention allows for a systematic assessment of the numerical importance of the component of the luminosity function paired to said function of the hierarchical set by the first one-to-one correspondence and/or of the error originated by neglecting said component. The selection condition and/or the evaluation of the error affecting the reconstruction of the luminosity may profit from these assessments, which therefore may improve the reconstruction of the luminosity impinging on the image plane and thus the rendering of the image of the three-dimensional scene. Alternatively, these assessments may reduce the computational load required to satisfactorily render the image.

Moreover, these assessments may be achieved without having to explicitly compute said component, which may reduce the computational load needed to perform the method according to the present invention.

In this case, the first set of function is a so-called sparse tree of the second set of functions. Moreover, the first linear combination and thus the luminosity function are a sparse representation of the luminosity impinging on the image plane and coming from the three-dimensional scene.

For instance, the first collection may comprise P mutually disjoint levels $L_1, L_2, \ldots, L_p$. The generic element $L_d$ of the first collection is associated to a corresponding level parameter $\beta_d$, wherein d may be any positive integer lower than or equal to P. The bound function, $G_B$, is a decreasing function defined at least on the set comprising all the level parameters associated to the elements of the first collection. Given the luminosity function, $f_L$, for at least a function, $\bar{f}$, e.g. for each function, of the second set of functions, the following relation holds:

$$|[f_L, \bar{f}]| \leq G_B(\bar{\beta}), \quad \text{(IX)}$$

wherein $\bar{\beta}$ is the level parameter associated to the level $\bar{L}$, which is the element of the first collection, to which the function $\bar{f}$ belongs. The square brackets, "[,]" denote the inner product of the inner product space.

The inner product between the luminosity function and each function of the second set of functions may in particular be equal and/or proportional to the component of the luminosity function paired to said function of the second set of functions by the first one-to-one correspondence.

As known in the prior art, a set of wavelets, W, may be naturally grouped into a first collection of mutually disjoint levels satisfying the aforementioned requirements. In particular, the first collection is countable and each element of the first collection is in one-to-one correspondence to a level parameter, which is a positive integer number.

In this case, if the luminosity function is $\alpha$-Lipschitz in the image plane, equation (IX) holds for each wavelet $\bar{f}$. The bound function $G_B(\beta)$ may be proportional to $2^{-\alpha\beta}$, i.e. $G_B(\beta) = \Gamma_{1,W} 2^{-\alpha\beta}$, wherein $\Gamma_{1,W}$ is a positive number. If the luminosity function is bounded, the bound function may be given by $G_B(\beta) = \Gamma_{2,W} 2^{-\beta}$, in terms of the positive number $\Gamma_{2,W}$.

Moreover, the functions of the second set belonging to the same level may share particular properties. For example, the area of the support of the generic wavelet belonging to the level associated to the level parameter $\bar{\beta}$ is smaller than or equal to $\Gamma_{3,W} 2^{-2\bar{\beta}}$, wherein $\Gamma_{3,W}$ is a positive number.

The organisation of the elements of the second set of function into levels may rationalise, simplify and improve the efficiency of the numerical implementation of the method according to the present invention.

In another embodiment of the method according to the present invention, at least the selection condition associated to a function of the second set comprises at least the requirement that the level parameter associated to the level of the first collection to which said function belongs is smaller than or equal to at least a given level bound. In particular, the selection conditions associated to substantially each function of the second set comprise the aforementioned requirement.

The level bound may be chosen according to the desired image resolution by using e.g. known correspondences between image resolution and sparse representations. For example, if the second set of functions is a subset of a set of wavelets, W, and if the image resolution is characterized by a given area $A_{res}$ the level bound may be the level parameter $\hat{\beta}_B$ associated to the level $\hat{L}_B$ such that the support of the functions of the level $\hat{L}_B$ is equal to the area $A_{res}$ e.g. $\hat{\beta}_B$ is equal to the integer part of $\log_2(\Gamma_{3,W}/A_{res})/2$. If the image is to be rasterized, the given area $A_{res}$ may e.g. be the area of the pixels, which constitute the rasterisation of the image.

In this embodiment, the selection condition allows for limiting the number of functions entering the first linear combination and thus the dimension of the first linear system. This could reduce the number of luminosity samples needed to compute the coefficients of the first linear combination and streamline the computation of the solution of said system. Therefore, the computational load needed to carry out the method according to the present invention will be substantially reduced.

Moreover, the selection condition according to this embodiment consistently selects functions belonging to the levels associated to parameters lower than the level bound, which are paired to the most relevant components of the set of components associated to the luminosity function, cf. equation (IX).

In an embodiment of the method according to the present invention, the first subset can be expressed as the union of the elements of a second collection. The elements of the second collection are mutually disjoint subsets of the image plane, and each element of the second collection is paired via a second one-to-one correspondence with one level of the first collection, which shares at least a function with the first set of functions.

For instance, in this embodiment there is at least a pairing function which is bijective and which pairs each element of the second collection with one corresponding level of the first collection, wherein said level shares at least a function with the first set of functions, i.e. the intersection between said level and the first set of functions is a non-empty set.

Moreover, the points of each element of the second collection are distributed according to a second distribution criterion associated to said element of the second collection. The second distribution criterion depends at least on the distribution of the support of the functions, which belong to (i) the first set of functions and (ii) to the level of the first collection which is paired by the second one-to-one correspondence to said element of the second collection.

In an exemplary embodiment of the present invention, for at least an element of the second collection the second distribution criterion associated to said element of the second collection comprises at least the requirement that, for at least a tile, e.g. for substantially each tile, of the first set of tiles, the number of points of said element of the second collection belonging to said tile is greater than or equal to the sum of a second total weight factor.

The second total weight factor is the sum of the weight factors of the functions of the first set of functions, which: (i) belong to the paired level of the first collection and (ii) have a support which overlaps said tile. In particular, the paired level of the first collection is the level paired by the second one-to-one correspondence to said element of the second collection.

The second total weight factor increases as the number of functions of the first set and of the paired level, the support of which overlaps said tile, increases, i.e. as the number of functions of the paired level that, according to the first selection condition, need to be used to satisfactorily reconstruct the luminosity impinging on said tile.

Moreover, the second total weight factor increases as the weight of the functions, the support of which overlaps said tile, increases, i.e. as the importance of the functions of the paired level needed to satisfactorily reconstruct the luminosity impinging on said tile increases. Therefore, said number may be considered to be a lower bound encoding the local features of the luminosity and thus the local features of the image of the three-dimensional scene.

In this case, the second distribution criterion allows for distributing at least some of the points of the first subset, and thus the luminosity samples, according to the number of functions of the paired level needed for a satisfactory reconstruction of the luminosity impinging on said tile and according to the importance of said functions. This may allow for distributing the luminosity samples according to the local features of the luminosity and to the importance of the functions entering in the first linear combination. This will improve the reconstruction of the luminosity impinging on the image plane and thus the rendering of the image of the three-dimensional scene.

Alternatively or in conjunction, the second distribution criterion associated to said element of the second collection comprises at least the requirement that, for at least a tile e.g. for substantially each tile of the first set of tiles, the number of points of said element of the second collection belonging to said tile is greater than or equal to the product between a second factor and the second total weight factor. For instance, the second factor is greater than or equal to one.

The second factor allows for increasing the numerical stability of the solution of the first linear system as well as the robustness of said solution with respect to small inaccuracies that can be introduced when constructing e.g. by sampling the first subset of the image plane and/or that can be introduced by noise that may arise when evaluating the pointwise luminosity at the points of the first subset of the image plane In another embodiment of the method according to the present invention, the first linear combination involves the functions of a second local set of functions of the first set of functions. The second local set of functions comprises the elements of the first set of functions, the support of which overlaps the region of the image plane.

Moreover, the first linear system is obtained by imposing the value of the second linear combination at each point of a second local subset of the first subset of the image plane to be substantially equal to the value of the luminosity at said point.

Further, the second local subset comprises substantially each point of the first subset which fulfills a first and/or a second condition, wherein the first condition requires the point of the first subset to belong to the region.

The second condition requires the existence of at least a function of the first set of functions the support of which (i) overlaps the region of the image plane and (ii) comprises the point of the first subset. Moreover, according to the second condition, the point of the first subset has also to belong to the element of the second collection paired by the second one-to-one correspondence to the level to which said function belongs.

For instance, given a point of the image plane with coordinates ii, the second condition is fulfilled if there exists a level $\tilde{L}$ and a function $\tilde{f}$ of the first set of functions such that $$\tilde{f} \in \tilde{L}, \tilde{u} \in \sigma(\tilde{f}) \cap \tilde{S}, \text{ and } \sigma(\tilde{f}) \cap R \neq \emptyset, \qquad (X)$$

wherein $\sigma(\tilde{f})$ is the support of the function $\tilde{f}$ and wherein $\tilde{S}$ is the element of the second collection paired by the second one-to-one correspondence to the level $\tilde{L}$. In the equation above, R denotes the region of the image plane.

For example, the construction of the second local set of functions and of the second local subset may be achieved by applying a third construction method associated to the region of the image plane.

More specifically the third construction method associated to a generic region of the image plane comprises at least the steps of:

constructing the second local set of functions by selecting each function of the first set of functions, such that the support of said function overlaps the generic region of the image plane;

for at least a specified level of the first collection, in particular for a plurality of levels of the first collection, in particular for each element of the first collection, constructing a selected subset of the image plane associated to the specified level by applying a fourth construction method associated to the specified level and to the local set of functions; and constructing the second local subset, wherein the second local subset comprises at least the subset of the image plane associated to the specified level.

In particular, the fourth construction method associated to a generic level and to a generic subset of the second set of functions comprises at least the steps of:

constructing a selected region of the image plane, wherein the selected region comprises each point of the image plane, such that said point belongs to the support of at least a function of the generic subset, wherein said function belongs to the generic level; and constructing the selected subset of the image plane associated to the generic level, wherein said subset comprises each point of the specified region, wherein said point belongs to the element of the second collection, which is paired to the generic level by the second one-to-one correspondence.

This embodiment of the method according to the present invention allows for reconstructing the luminosity impinging on the region of the image plane by using a minimal set of functions, i.e. the functions of the first set of functions which do not vanish in the region. Moreover, said reconstruction is achieved by using only the luminosity samples located at the points of the first subset of the image plane, which fall in the supports of the functions of the local set of functions. This will limit the size of the first linear system and thus improve the quality of reconstruction and/or the performance of the method according to the present invention. Furthermore, this may reduce the computational load needed to carry out the method according to the present invention.

In an embodiment of the present invention, at least the selection condition associated to at least a third function of the second set comprises at least the requirement that at least an element of a comparison set is smaller than or equal to a given threshold value associated to the third function. In particular, the selection conditions associated to substantially each function of the second set comprise the requirement that at least an element of a comparison set is smaller than or equal to a given threshold value associated to said function of the second set.

The comparison set comprises at least the values of a first parameter function at at least a comparison subset of points of the support of said function of the second set. In particular, the first parameter function is defined on the image plane and describes the variation of the value of a comparison parameter in the image plane.

The selection condition allows for selecting the functions of the second set that will enter in the first linear combination. This selection may in particular be carried out according to the numerical relevance of the inner product between the luminosity function and the functions of the second set and/or according to a numerical precision required in the construction of the luminosity function. In particular, said numerical precision is a threshold value for the absolute value of the aforementioned inner product, above which the corresponding function of the second set may be selected.

The comparison parameter, and thus the first parameter function, may thus be related to the numerical relevance of the absolute value of the aforementioned inner product, while the threshold value is in particular related to the required numerical precision. Moreover, the comparison parameter at a generic point of the image plane, and thus the first parameter function at said generic point, may be related to the regularity of the luminosity function in said generic point. Further, the first parameter function may for instance be a positive definite function, i.e. the image of the first parameter function may contain only positive numbers.

For instance, if the second set of function is a subset of a set of wavelets, $\mathcal{W}$, and the luminosity function $f_L$ is bounded, for each wavelet function $\overline{\psi}$ the quantity $|[f_L, \overline{\psi}]|$, and thus e.g. the component of the luminosity function paired to said wavelet by the first one-to-one correspondence, is smaller than or equal to the positive number $\Gamma_{2,W}$. Therefore, for each wavelet, the first parameter function may be the constant function mapping all the points of the image plane to the negative number $-\Gamma_{2,W}$, which constitutes the comparison set. Moreover, in this case the threshold value, $t_h$, associated to each wavelet may be the opposite of the numerical precision, $\in$, i.e. $t_h = -\in$.

For example, for at least a function, $\overline{f}$, of the second set of functions, the comparison set, $S_{comp}$, may at least comprise the image of the support of said function under the first parameter function, $f_{p1}$, i.e. $S_{comp} \supseteq \{y \in \mathbb{R}$ such that $\exists u \in \sigma(\overline{f})$ such that $y = f_{p1}(u)\}$, wherein $\sigma(\overline{f})$ is the support of the function $\overline{f}$.

In this embodiment, the selection condition comprises a comparison between numerical values, a comparison, which can be easily implemented to be carried out by a computer. Such implementation is numerically stable, precise (e.g. of the order of the machine precision), and computationally light, which reduces the computational load needed to carry out the method according to the present invention.

In another embodiment of the present invention, for at least a decreasing threshold function of the level parameter, the threshold value of the third function, e.g. of substantially each function, of the second set of functions is the value of said threshold function evaluated at the value of the level parameter associated to the level, to which said function belongs.

In particular, the decreasing threshold function is defined at least on the set comprising all the level parameters associated to the elements of the first collection and decreases as the value of the level parameter increases.

For instance, if the second set of function is a subset of a set of wavelets, W, and the luminosity function $f_L$ is $\alpha$-Lipschitz in the image plane, for each wavelet function $\overline{\psi}$ belonging to the level $\overline{L}$ associated to the level parameter $\overline{\beta}$ the quantity $|[f_L, \overline{\psi}]|$, and thus e.g. the component of the luminosity function paired to said wavelet by the first one-to-one correspondence, is smaller than or equal to the quantity $\Gamma_{1,W} 2^{-\alpha \overline{\beta}}$. Therefore, for said wavelet the first parameter function may be the constant function mapping the points of the image plane to the Lipschitz exponent $\alpha$, said exponent constituting the comparison set as well. Moreover, in this case the decreasing threshold function, $G_{th}(\beta)$ is e.g. given by $$G_{th}(\beta) = 1/\beta \times \log_2(\in/\Gamma_{1,W}), \qquad (XI)$$

in terms of the numerical precision, $\in$.

In this case, the selection condition comprises a comparison between numerical values of functions, functions which can be easily implemented in a computer.

Moreover, in this case the threshold of substantially each function of the second set may be obtained by a single function (i.e. the first parameter function) and thus does not need to be chosen, implemented, and stored for each function of the second set of functions separately.

This would reduce the size of the memory space required by the method and thus improve the memory management of the computer implementing the method. The computational load needed to carry out the method according to the present invention will be reduced as well, since the computer implementing the method does not have to access a storage device storing the thresholds associated to the functions of the second set of functions.

Furthermore, in this case the absolute value of the inner product between the luminosity function and the element of the second set of functions is directly related to the numerical precision, which is a quantitative and objective parameter allowing for characterizing a satisfactory reconstruction of the image.

An embodiment of the method according to the present invention further comprises the step of:

g) computing the first parameter function by using the values of the comparison parameter evaluated at the points of a second subset of the image plane.

Moreover, the value of the comparison parameter at substantially each point of the image plane is obtained by using a given second parameter function. In particular, the second parameter function is defined on the image plane. Furthermore, the value of the comparison parameter and/or the value of the comparison function at substantially each point of the image plane may depend at least on the value of the luminosity at said point.

In particular, the first parameter function may be obtained by the values of the comparison parameter evaluated at the points of a second subset of the image plane by determining the Voronoi diagram over the second subset of the image plane.

Moreover, the first parameter functions may be obtained by assigning to the generic point of the image plane the value of the comparison parameter evaluated at the point of the second subset, which is the closest point to said generic point.

Further, the first parameter functions may be expressed in terms of a fifth linear combination involving the function of a third set of functions defined on the image plane. Moreover, the coefficients of the fifth linear combination may be computed by using the reproducing kernel technique performed with at least some of the functions of the third set of functions, at least a subset of the second subset of the image plane and at least the value of the comparison parameter evaluated at the points of said subset of the second subset of the image plane.

The third set of functions may be a subset of a basis and/or of a frame of the inner product space. Said basis and/or said frame may be selected from a list comprising at least a set of wavelets, a set of shearlets, a set of curvelets, a characteristic basis, the B-splines, or combinations thereof.

A characteristic basis may comprise the characteristic functions associated to the elements of a partition of the image plane. In particular, the characteristic function associated to the generic element X of said partition is equal and/or equivalent to the function:

$$\xi(u) = \begin{cases} 1 & \text{if } u \in X \\ 0 & \text{if } u \notin X \end{cases}. \quad \text{(XII)}$$

In particular, said characteristic function may be equal and/or equivalent to $\xi/\sqrt{\mathcal{A}_X}$, wherein $\mathcal{A}_X$ is the area of the generic element X of said partition.

Furthermore, the first parameter function may be constructed by using a third set of tiles tiling the image plane. In particular, the first parameter function may be constructed as equivalent to a sixth linear combination involving the characteristic function associated to each tile of the third set of tiles. For each tile of the third set of tiles, the value of the coefficient multiplying the characteristic function associated to said tile is in particular equal to the value of the comparison parameter evaluated at the point of the second subset, which is closest to said tile and/or to a given reference point of said tile.

In this embodiment, the first parameter function may be reconstructed by using the pointwise values of the comparison parameter. This allows for using functions without a known analytic expression as first parameter function, functions which may lead to a more efficient selection condition and thus lead to an improvement of the reconstruction of the image of the three-dimensional scene.

Moreover, in this case the first parameter function may ultimately depend on the luminosity of the light impinging on the image plane, since the pointwise values of the comparison parameter and/or the comparison function may depend on said luminosity. Therefore, the first parameter function and thus the threshold associated to the third function, e.g. to the functions of the second set of functions, are based on the features of the light coming from the three-dimensional scene and thus from the features of the three-dimensional scene itself. This would increase the quality of the reconstruction of the image of the three-dimensional scene.

In particular, the second parameter function is the Hölder function. According to the present invention the Hölder function at a generic point of the image plane with coordinates u can be computed from at least the pointwise value of the luminosity at said generic point, $l_w$ and from the values of the luminosity at the points of a first surrounding set, $N_u$, of said generic point.

A surrounding set of a generic point of the image plane is a neighbourhood of said generic point. In particular, a surrounding set may comprise the points of the image plane and/or of the second subset of the image plane, which are at distance less than a given value from said generic point. Alternatively or in conjunction a surrounding set may comprise a fixed amount of points of the second subset of the image plane, say K, which are the K closest points to said generic point. Moreover, a surrounding set may comprise a fixed amount of points of the image plane, which are at distance less than a given value from said generic point.

The functional expression of a Hölder function, $f_H$, at said generic point reads as follows:

$$f_H(u) = \inf_{v \in N_u} \left\{ \log_{\|u-v\|} \left( \frac{|l_v - p_{H,u}(v)|}{\Gamma_H} \right) \right\}. \quad \text{(XIII)}$$

wherein $l_v$ is the value of the pointwise luminosity at the point of the first surrounding set with coordinates v, and $p_{H,u}$ is a polynomial function of the coordinates v. The number $\Gamma_H$ is the Hölder constant, a positive number which can e.g. be obtained by means of a calibration procedure using known luminosity functions.

The value of the Hölder function at a generic point of the image plane is in particular an estimation of the Lipschitz exponent of the luminosity function at said generic point. In particular, it is lower than or equal to the Lipschitz exponent of the luminosity function.

Since the value of the Lipschitz exponent at a generic point and thus the degree of the polynomial entering in equation (II) depends on the regularity of the luminosity function at said generic point, the degree of the polynomial function $p_{H,u}$ may depend on whether the luminosity at said generic point is smooth according to a given smoothness criterion. For instance, if the luminosity is not smooth, the polynomial has degree zero and is given by $p_{H,u}(v)=l_u$. If the luminosity is smooth, the polynomial function $p_{H,u}$ has degree one and is given by $p_{H,u}(v)=l_u+d_u\cdot(v-u)$, wherein the dot "·" represents the two-dimensional Euclidean scalar product and $d_u$ is a two-dimensional vector associated to the generic point.

The two-dimensional vector $d_u$ is e.g. a (possibly numerical and/or semi-analytical) approximation of the gradient of the functional expression of luminosity in the image plane. Therefore, $d_u$ may be computed by using finite differences computed by using the pointwise value of the luminosity in the generic point and the pointwise value of the luminosity at at least one point of a second surrounding set of the generic point. For example, the second surrounding set may be equal to the first surrounding set.

Alternatively or in conjunction, the two-dimensional vector $d_u$ may be computed by using the stored input data, the rendering equation, and/or the scattering function. In particular, the rendering equation and the scattering function allow for obtaining the two-dimensional vector $d_u$ as a (possibly semi-analytical) approximation of the gradient of the functional expression of the luminosity in the image plane, by e.g. using equation (VIII) in conjunction with equation (VII) to estimate the gradient of the functional expression of the luminosity in the image plane. In this case, the two-dimensional vector $d_u$ provides directional information concerning the smoothness of the luminosity, which is in particular important for directional bases such as bases comprising a set a curvelets, a set of shearlets, and/or combinations thereof.

The smoothness criterion allows for establishing whether the luminosity at a generic point of the image plane is smooth. It may for instance comprise at least the requirements of determining (i) at least a first ray impinging on a control point of a third surrounding set of said generic point; (ii) a second ray impinging on said generic point; and (iii) whether the first and the second ray intersect different connected components of the scene manifold. In particular, the third surrounding set may be equal to the first and/or to the second surrounding set.

If the first and the second ray intersect different connected components of the scene manifold, the luminosity at said generic point is considered not smooth. If these rays intersect the same connected component of the scene manifold then the luminosity in the generic point is considered smooth. The first ray and/or the second ray are e.g. determined by using ray tracing and/or ray casting.

For example, if the second set of function is a subset of a set of wavelets, W, and the luminosity function $f_L$ is piecewise smooth in the image plane, the first set of functions does not contain each excluded function of the second set of functions satisfying an exclusion condition. The exclusion condition requires that, in each point of the comparison set, the first parameter function is bigger than the value, $\gamma_{th}$, that the threshold function defined in equation (XI) assumes in correspondence to the parameter associated to the level, to which said excluded function belongs. If the first parameter function is obtained by using the Hölder function, the exclusion condition implies in particular that the Lipschitz exponent of the luminosity function in each a point of the comparison set is bigger than the value $\gamma_{th}$.

In this embodiment, the selection criterion renders the first set of function the sparse tree that allows for an accurate reconstruction of the luminosity of the light impinging on the image plane, in particular if the image is a piecewise smooth image. In particular, the approximate rate attained by said sparse tree is equivalent to those of the m-term approximation.

Moreover, this embodiment of the method according to the present invention allows for a quantitative assessment of the error affecting said reconstruction, since it allows for constructing a sparse tree, which attains the aforementioned approximation rate.

For instance, if the second set of functions is a subset of a set of wavelets, the reconstruction of the luminosity is quasi-optimal, e.g. the error affecting the reconstruction is of the order of $1/\theta$, wherein $\theta$ is the cardinality of the first set of functions. Moreover, if the second set of functions is a subset of a set of curvelets and/or shearlets, the error affecting the reconstruction is even smaller, e.g. optimal up to a logarithmic factor. For instance, in the case of the curvelets said error is of the order of $(\log \theta)^3/\theta^2$.

An embodiment of the method according to the present invention further comprises the step of:

h) constructing the second subset by sampling the image plane according to a third distribution criterion, wherein the third distribution criterion depends at least on the location of the support of the elements of a first subset of the second set of functions on the image plane.

For example, in this embodiment the second subset of the image plane may be constructed by defining a sampling distribution fulfilling the third distribution criterion and by sampling the image plane according to this sampling distribution.

Moreover, the second subset of the image plane may be constructed by using the first set of tiles and a second sampling procedure. According to the second sampling procedure, for at least a tile e.g. for substantially each tile of the first set of tiles, a number of sampled points of said tile are sampled, in particular randomly sampled, wherein said number depends on the number of functions of the first subset of the second set of functions, the support of which overlaps said tile. The second subset of the image plane is thus constituted by substantially all the sampled points obtained according to the second sampling procedure, e.g. the second subset is given by the union of all the sampled points sampled according to the second sampling procedure.

The third distribution criterion may comprise at least the requirement that for at least a tile, e.g. for substantially each tile, of the first set of tiles the number of points of the second subset belonging to said tile is greater than or equal to a third total weight factor.

The third total weight factor is the sum of the weight factors of the functions, which (i) belong to the first subset of the second set of functions, and (ii) have a support which overlaps said tile.

Alternatively or in conjunction, the third distribution criterion may comprise the requirement that for at least a tile, e.g. for substantially each tile, of the first set of tiles the number of points of the second subset belonging to said tile is greater than or equal to the product between a third factor and the third total weight factor. For instance, the third factor is greater than and/or equal to one.

The third factor allows for increasing the numerical stability of the computation of the first parameter function as well as the robustness of said computation with respect to small inaccuracies that can be introduced when sampling the second subset of the image plane and/or that can be introduced by noise arising when evaluating the pointwise luminosity at the points of the second subset of the image plane In particular, the first subset of the second set of functions comprises at least the functions of the second set of functions, which belong to a first level of the first collection.

The efficiency of the construction of the luminosity function depends on a good localization of the functions of the first set of functions. On the other hand, an efficient representation of regular sub-regions of the image requires functions that span large sub-regions of the image plane. The choice of the first level is in particular based on the balance of these two competing objectives.

For example, the first level may be chosen by requiring that the projection onto the coordinate axis of the image plane of the functions of the first set of functions belonging to the first level should cover at least a given fraction of the area and/or of the axes of the image plane. For instance the given fraction is 20% of the area and/or of the axes of the image plane.

Moreover, the first level may be chosen by requiring that the area of the support of the functions of the second set, which belongs to the first level, is smaller than or equal to the area $A_R$ of the region of the image plane. For instance, if the second set of functions is a subset of a set of wavelets, W, the first level $\overline{L}_1$ may be the level associated to the level parameter $\overline{\beta}_1$, wherein $\overline{\beta}_1$ is greater than or equal to the integer part of $\log_2(\Gamma_{3,W}/A_R)/2$.

Moreover, the first level may be chosen by requiring that the functions of the second set, which belongs to the first level, are localized enough to be able to represent smoothly varying signals over relatively large portions of the image plane. This would enable to sparsely sample the luminosity impinging on a portion of the image plane where the luminosity is smooth, e.g. over a portion of the image plane where the Lipschitz parameter of the luminosity is relatively large.

This way, the points of the second subset of the image plane are appropriately distributed in the region and/or in the image plane. This would allow for a relatively accurate construction of the first parameter function, which would improve the reliability of the selection of the functions of the first set and ultimately of the reconstruction of the luminosity of the light impinging on the region and/or in the image plane.

The construction of the first set of functions and/or of the first subset of the image plane may be performed level-by-level, e.g. by repeating an appropriate procedure over the levels of a third collection of levels, wherein the third collection includes the levels of the first collection, which have a non-empty intersection with the second set of functions.

For each level, the appropriate procedure may select some functions of the second set of functions as members of the first set of functions, wherein the selected functions fulfill appropriate, possibly level-dependent conditions and belong to said level. Moreover, the appropriate procedure may select a subset of the image plane to be part of the first subset of the image plane, wherein said selected subset is constructed according to level-dependent requirements.

In particular, in an exemplary embodiment of the present invention, at least a first subset of the first set of functions and a first subset of the first subset of the image plane are set to be respectively the first and the second output of a second construction method, wherein the second construction method is associated to a second level of the first collection and to a first input subset of the image plane. In particular, the second level belongs to the third collection.

More specifically, the second construction method associated to a given level of the first collection and to a given input subset of points of the image plane uses the given input subset to obtain a first output and a second output, wherein the first output is a second output set of functions and the second output is a first output subset of the image plane.

Moreover, the second construction method comprises at least the steps of:

constructing the first parameter function by using at least the values of the comparison parameter evaluated at the points of the given input subset and by using the second parameter function;

constructing the second output set of functions by selecting each function of the second set of functions satisfying the selection condition associated to said function and such that said function belongs to the given level; and constructing the first output subset by sampling the image plane according to a fourth distribution criterion, wherein the fourth distribution criterion depends on at least the location of the support of the elements of the second output set of functions on the image plane.

In particular, the first subset of the first set of functions contains the functions of the second set, which are required to represent the luminosity on the second level, or, equivalently, the elements of the first set of functions belonging to the second level.

For example, in this embodiment the first output subset may be constructed by defining a sampling distribution fulfilling the fourth distribution criterion and by sampling the image plane according to this sampling distribution.

Moreover, the first output subset of the image plane may be constructed by using the first set of tiles and a third sampling procedure. According to the third sampling procedure, for at least a tile, e.g. for substantially each tile, of the first set of tiles, a number of sampled points of said tile are sampled, in particular randomly sampled, wherein said number depends on the number of functions of the second output set of functions, the support of which overlaps said tile. The first output subset is thus constituted by substantially all the sampled points obtained according to the third sampling procedure, e.g. the first output subset is given by the union of all the sampled points sampled according to the third sampling procedure.

The fourth distribution criterion may comprise at least the requirement that for at least a tile, e.g. for substantially each tile, of the first set of tiles, the number of points of the first output subset belonging to said tile is greater than or equal to a fourth total weight factor.

The fourth total weight factor is the sum of the weight factors of the functions which: (i) belong to the second output set of functions, and (ii) have a support which overlaps said tile.

In this case, the fourth distribution criterion allows for distributing the points of the first subset of the first subset of the image plane, and thus the corresponding luminosity samples, according to the number of functions of the first subset of the first set of functions needed for a satisfactory reconstruction of the luminosity impinging on said tile and according to the importance of said functions. This may allow for distributing the luminosity samples according to the local features of the luminosity and to the importance of the functions entering in the first linear combination. This will improve the reconstruction of the luminosity impinging on the image plane and thus of the image of the three-dimensional scene.

Alternatively or in conjunction, the fourth distribution criterion may comprise the requirement that for at least a tile, e.g. for substantially each tile, of the first set of tiles, the number of points of the first output subset belonging to said tile is greater than or equal to the product between a fourth factor and the fourth total weight factor. The fourth factor is e.g. greater than or equal to one.

The fourth factor may be equal to the value of a factor function, which is defined at least on the third collection. The factor function may increase as the level parameter increases e.g. to account for the presence of the selection condition, which may allow for excluding the functions of the second set of functions belonging to levels associated to level parameters greater than the level bound.

The fourth factor allows for increasing the numerical stability of the solution of the first linear system as well as the robustness of said solution with respect to small inaccuracies that can be introduced when constructing e.g. by sampling the first subset of the image plane and/or that can be introduced by noise arising when evaluating the point-wise luminosity at the points of the first subset of the image plane.

Moreover, the second construction method may be performed for each level of the third collection to construct the first set of functions and the first subset of the image plane. More specifically, the first set of functions may then be constituted by the union of the first outputs of the second construction method associated to the levels of the third collection. Moreover, the first subset of the image plane may be constituted by the union of the second outputs of the first construction method associated to the levels of the third collection.

In this case, the task of constructing the first set of functions and the first subset of the image plane may be split according to the levels of the third collection. This level-based splitting does not affect the quality of the reconstruction of the image, since the numerical importance of the coefficients of the functions entering the first linear combination depends on the level said functions belong to.

This allows for distributing the execution of the method among different processors units and thus for streamlining and/or for improving the reconstruction of the image of the three-dimensional scene. In particular, the computational capability of said processors units may focus on the construction of a part of the first set of functions and of a part of the first subset of the image plane only, rather than having to construct the complete first set of functions and the complete first subset of the image plane.

If the second construction method is executed for several levels of the first collection and these executions take place in sequence one after the other, the output obtained by an execution of the second construction method may be used as input of at least a subsequent one.

In particular, in an exemplary embodiment of the method according to the present invention, at least a second subset of the first set of functions and a second subset of the first subset of the image plane are set to be respectively the first and the second output of the second construction method. Said second construction method is associated to a third level of the first collection and to a second input subset of the image plane. In particular the third level belongs to the third collection. Moreover, the second input subset comprises at least the first input subset and/or at least the first subset of the image plane.

In this case, the method according to the present invention allows for optimising the use of the luminosity samples, which e.g. have been computed during the execution of the second construction methods associated to the levels of the third collection. This way, the reconstruction of the image may be improved without significantly increasing the computational load needed to carry out the method, since the aforementioned luminosity samples increase the size of the input subset of the second construction method and thus improve the reliability of the reconstruction of the first parameter function. This would improve the reliability of the selection of the functions of the first set and ultimately of the reconstruction of the luminosity of the light impinging on the region and/or on the image plane.

In another embodiment of the present invention the first set of functions is constructed by iterating a number of times a first construction method.

The first construction method uses a first input set of functions to obtain a first output set of functions, wherein the first input set of functions and the first output set of functions are subsets of the second set of functions.

In particular, the first construction method comprises at least the steps of:
constructing an iteration subset of the image plane by sampling the image plane according to a fifth distribution criterion, wherein the fifth distribution criterion depends on at least the location of the support of the elements of the first input set of functions on the image plane;
constructing the first parameter function by using at least the values of the comparison parameter evaluated at the points of the iteration subset of the image plane and by using the second parameter function;
constructing the first output set by selecting each function of the second set of functions satisfying the selection condition associated to said function.

The first input set of functions of the initial iteration of the first construction method is a given subset of the second set of functions. Moreover, the first input set of functions of each iteration of the first construction method different from the initial iteration of the first construction method is the first output set of functions of the immediately previous iteration of the first construction method. Furthermore the first set of functions is the first output set of functions obtained after the last iteration of the first construction method.

The method according to the present invention may check if one or more stopping conditions are fulfilled and may stop the iteration if at least one and/or all of these conditions are fulfilled. A stopping condition can for instance be that the number of iterations is equal to a given maximum number of iterations. Moreover, a stopping condition may be that the first input set of functions and the first output set of functions of the latest executed first construction method are equal. For example, the check described above may be performed after each execution of the first construction method.

Furthermore, in this embodiment the iteration subset may be constructed by defining a sampling distribution fulfilling the fifth distribution criterion and by sampling the image plane according to this sampling distribution.

Moreover, the iteration subset may be constructed by using the first set of tiles and a fourth sampling procedure. According to the fourth sampling procedure, for at least a tile, e.g. for substantially each tile, of the first set of tiles, a number of sampled points of said tile are sampled, in particular randomly sampled, wherein said number depends on the number of functions of the first input set of functions, the support of which overlaps said tile. The iteration subset is thus constituted by substantially all the sampled points obtained according to the fourth sampling procedure, e.g. the iteration subset is given by the union of all the sampled points sampled according to the fourth sampling procedure.

The fifth distribution criterion may comprise at least the requirement that for at least a tile, e.g. for substantially each tile, of the first set of tiles the number of points of the iteration subset belonging to said tile is greater than or equal to a fifth total weight factor.

The fifth total weight factor is the sum of the weight factors W of the functions which: (i) belong to the first input set of functions, and (ii) have a support which overlaps said tile. Alternatively or in conjunction, the fifth distribution criterion may comprise the requirement that for at least a tile, e.g. for substantially each tile, of the first set of tiles, the number of points of the iteration subset belonging to said tile is greater than or equal to the product between a fifth factor and the fifth total weight factor. For instance, the fifth factor is greater than or equal to one and e.g. is lower than two.

In this embodiment, the first set of functions is constructed iteratively starting from a given subset of the second set of functions. This improves the construction of the first set of functions and thus the reconstruction of the image, since each iteration refines the first parameter function and thus the selection conditions of the functions of the second set of functions.

In particular, the second construction methods may be performed in sequence and in ascending order of the level parameter associated to the level, to which said methods are associated to. If the second set of functions is a set of wavelet, the second construction methods are thus performed in sequence in ascending order of the area of the support of the functions of the level, to which said methods are associated to. More specifically, they are performed starting from the coarsest level (i.e. the level with functions having largest support) and ending with the finest level (i.e. the level with functions having smallest support).

In this case, each iteration of the second construction allows to "zoom in" on relevant features of the luminosity impinging on the image plane, and thus ultimately on relevant features of the three-dimensional scene. More specifically, the samples of a level are used to find said relevant features, i.e. those features that have frequency higher than those that can be represented by using the function of said level, and that have to be described by means of finer levels.

In another embodiment of the present invention, the image plane is tiled by a second set of tiles comprising the region as a tile.

Moreover, the method according to the present invention may further comprise the step of:
i) storing the information needed to describe each tile of a first plurality of the second set of tiles.

The information needed to describe at least a tile of the first plurality of tiles may be stored on a storage device, and/or according to a data storage model such as the Cloud storage or the Nearline storage model. In particular, the first plurality of tiles may be the second set of tiles.

For each tile of the first plurality of tiles, the information needed to describe said tile may depend on the tile itself and should guarantee the possibility to unambiguously assess whether a point of the image plane belongs to said tile.

For instance, if a tile of the first plurality of tiles is a circle said information may comprise the position of its center and the length of its radius. If said tile is a rectangle and/or a square, said information may comprise at least the position of its center and the position of two adjacent edges of its boundary. Said information may also be one or a plurality of conditions, which unambiguously characterise the points of said tile.

The construction of the luminosity function may be achieved by separately performing several tile-by-tile constructions, wherein each tile-by-tile construction allows for the construction of the luminosity in a corresponding tile of the second set of tiles. In this case, the luminosity function in a tile encodes the piece of the image on said tile. In particular, the tile-by-tile constructions of the luminosity function can be performed in sequence, in parallel, or in combination thereof. Moreover, said tile-by-tile constructions may be performed independently of each other or may be synchronised.

In particular, in an exemplary embodiment of the method according to the present invention, for each tile of the first plurality of tiles, the luminosity function in said tile is constructed as equivalent to a third linear combination associated to said tile, wherein said third linear combination involves the functions of at least a subset of the first set of functions.

Moreover, the value of the coefficients of the third linear combination associated to said tile is obtained by solving a second linear system associated to said tile. Said second linear system is obtained by imposing the value of a fourth linear combination associated to said tile at each point of at least a subset of the first subset of the image plane to be substantially equal to the value of the luminosity at said point.

The fourth linear combination associated to said tile involves at least the terms of the third linear combination associated to said tile and is in particular equal to the third linear combination associated to said tile. In particular, the second linear combination may involve at least functions belonging to the first set of functions and/or to the second set of functions. If said tile is the region of the image plane, the third and the fourth linear combination associated to said tile correspond to the first and the second linear combination, respectively.

Optionally, the second linear system associated to at least a tile of the first plurality of tiles is solved by using a least squares fit, an interpolation fit, and/or the reproducing kernel technique. In particular, the reproducing kernel technique is performed with at least some of the functions of the first set of functions, at least the points of a subset of the first subset of the image plane and at least the value of the luminosity at the points of said subset of the first subset of the image plane.

In particular, for at least a tile of the first plurality of tiles the luminosity function in said tile is constructed by performing a fifth construction method associated to said tile. The fifth construction method associated to a generic tile of the second set of tiles comprises at least the steps of:
  constructing a third local set of functions associated to said generic tile by selecting each function of the first set of functions such that the support of said function overlaps said generic tile;
  for at least a specified level of the first collection, in particular for a plurality of levels of the first collection, in particular for each element of the first and/or of the third collection, constructing a selected subset of the image plane associated to the specified level by e.g. applying the fourth construction method associated to the specified level and to the third local set of functions associated to said generic tile;
  constructing a second local subset associated to the given tile, wherein said second local subset comprises at least the selected subset of the image plane associated to the specified level;
  computing the coefficients of the third linear combination associated to said generic tile by solving the second linear system associated to the generic tile;
  storing the values of the coefficients of the fourth linear combination associated to said generic tile, which are comprised in the third linear combination associated to said generic tile, and storing the information needed to associate each coefficient of the third linear combination associated to the generic tile to the corresponding function, which is the function multiplying said coefficient in the third linear combination associated to said generic tile; and constructing the luminosity function in said generic tile as equivalent to the third linear combination associated to said generic tile.

The second linear system associated to the generic tile is obtained by imposing the value of the fourth linear combination associated to the generic tile at each point of the second local subset associated to the generic tile to be substantially equal to the value of the luminosity at said point.

In this case, the task of reconstructing the image of the three-dimensional scene may be split according to the tiles of the second set of tiles. This tile-based splitting allows for distributing the execution of the method among different processors units. This allows for streamlining the reconstruction of the image and/or for improving said reconstruction. In particular, the computational capability of said processors units may focus on the reconstruction of a part of the image only, rather than of the full image.

In an exemplary embodiment of the method according to the previous invention, for each tile of the first plurality of tiles, at least a third subset of the first set of functions and a third subset of the first subset of the image plane are set to be respectively the first and the second output of the second construction method associated to a fourth level of the first collection and to a second input subset associated to said tile, wherein the third input subset is a subset of the image plane, which comprises points of said tile. More specifically, a third subset of the first set of functions and the third subset of the first subset of the image plane are associated to said tile.

Moreover, the computation of the luminosity function in at least a second tile of the first plurality of tiles may be synchronised with the computation of the luminosity function in other tiles of the first plurality of tiles. In particular, the synchronisation is achieved by including in to the second input subset associated to the second tile all the points which (i) belong to the input subset associated to the other tiles of the first plurality of tiles, and (ii) fulfill an inclusion criterion associated to the second tile. In particular, said inclusion criterion may comprise the requirement that the point has to belong to the support of at least a function of the second set of functions, wherein the support of said function overlaps the second tile.

In another embodiment of the present invention, for each tile of the first plurality of tiles at least the coefficients of the fourth linear combination associated to said tile, which are comprised in the third linear combination associated to said tile, are stored.

Moreover, at least the information needed to associate each coefficient of the third linear combination associated to said tile to a corresponding function, which is the function multiplying said coefficient in the third linear combination associated to said tile, is stored.

The value of at least a third coefficient of the third linear combination associated to at least a tile of the first plurality of tiles and the information needed to associate the third coefficient to a corresponding fourth function, which is the function multiplying said coefficient in the third linear combination associated to said tile, may be stored on a storage device, and/or according to a data storage model such as the Cloud storage or the Nearline storage model.

For example, the information needed to associate the third coefficient to the fourth function may be stored by assigning a label to the functions of the first set of functions and by creating a table having entries specifying the value of the third coefficient and the label associated to the fourth function. Said table may also store information concerning the luminosity encoded by the luminosity function, such as the wavelength and/or of the color of the light the luminosity belongs to. Any structure or format may be used to associate third coefficient and the fourth function, insofar as the information can be reliably retrieved and interpreted correctly.

In an embodiment of the method according to the present invention, for each tile of the first plurality of tiles, the information needed to associate said tile to at least a coefficient, e.g. to all the coefficients, of the third linear combination associated with said tile is stored.

Said information may for instance be stored by assigning a label to said tiles and by creating a table having entries specifying said coefficient, e.g. all the coefficients, of the third linear combination associated to said tile, and the label associated to said tile. Any structure or format may be used to associate said tile and said coefficient, e.g. all the coefficients, of the third linear combination associated to said tile, insofar as the information can be reliably retrieved and interpreted correctly.

Moreover, said information may be stored on a storage device and/or according to a data storage model such as the Cloud storage or the Nearline storage model.

In this case, the information stored in the storage device allows for reproducing the reconstruction of the luminosity of the light impinging on the image plane. Therefore, the image may be stored according to a second storage procedure, which uses the aforementioned information. The second storage procedure requires a relative small size of the memory space and thus the impact of the second storage procedure on the memory management of the storage device is relatively limited, which allows for streamlining the exchange of images.

The present invention is also directed to a device configured for rendering at least partially an image of a three-dimensional scene on an image plane, said device including storage means, and a processor connected to said storage means, said processor being programmed to implement the steps of the method according to any one of the embodiments described herein.

Additionally, the present invention is directed to a computer program product comprising instruction modules which, when executed by a processor of a computer, causes the computer to implement the steps of the method according to any one of the embodiments described herein.

The processor of the computer and/or the processor comprised in the device according to the present invention may in particular be a graphics processing unit (GPU), which is an electronic circuit designed to accelerate the creation of images.

The device and the computer program product according the present invention implement the method according to the present invention, and thus inherit the aforementioned advantages of the method according to the present invention.

BRIEF DESCRIPTION OF THE DRAWINGS

Exemplary embodiments of the invention are described in the following with respect to the attached figures. The figures and corresponding detailed description serve merely to provide a better understanding of the invention and do not constitute a limitation whatsoever of the scope of the invention as defined in the claims. In particular:

DETAILED DESCRIPTION OF THE PRESENTLY PREFERRED EMBODIMENTS

Figure 1:
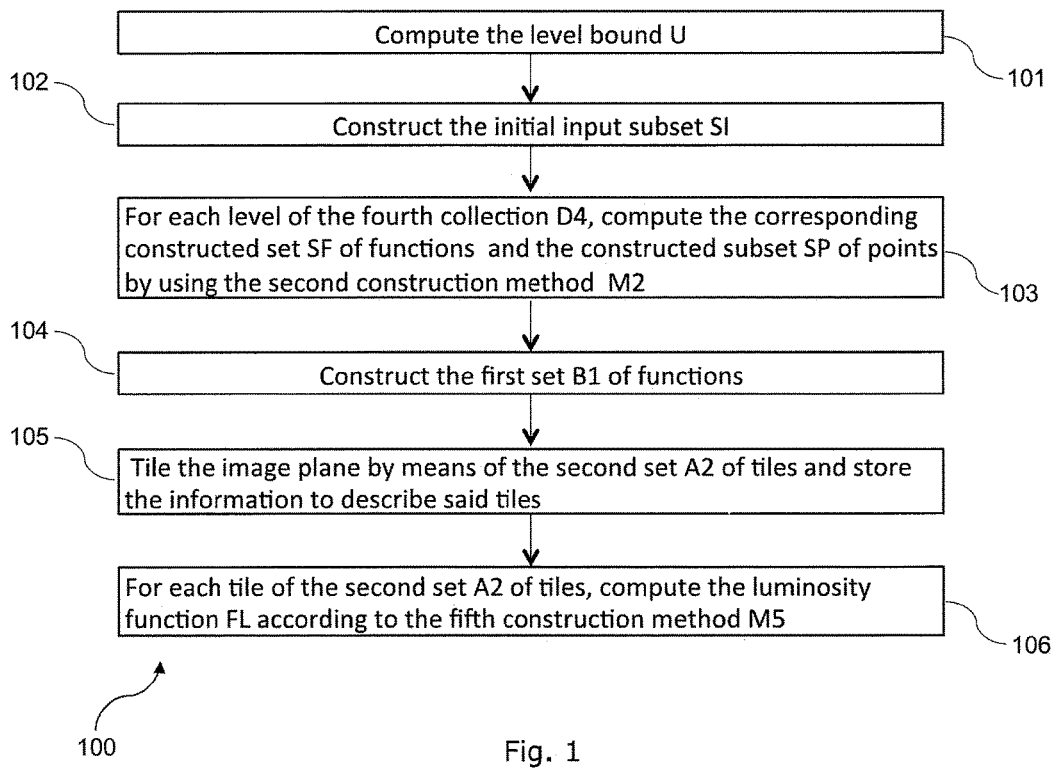
FIG. 1 is a flowchart 100 of a first embodiment of the method according to the present invention.

FIG. 1 illustrates a flow chart 100 of a first embodiment of the method according to the present invention, which allows for rendering an image, e.g. a piecewise smooth image, of the three-dimensional scene on the image plane I. The image plane I is a part of a plane and is parameterized by two Cartesian coordinates ranging from zero to one. Moreover the image plane is tiled by a first set of tiles. The tiles of the first set of tiles are typically, but not necessarily, rectangular and provide a cover for the image plane I. Moreover, the tiles of the first set of tiles may be equal and may have an area, $A_{res}$, which characterizes the image resolution.

The information needed to describe each tile of the first set of tiles may be stored on a storage device, and/or according to a data storage model such as the Cloud storage or the Nearline storage model.

The second set B2 of functions is a hierarchical set, which comprises functions having local support. For instance, the second set of functions is a subset of a set of wavelets, W. For instance, the second set of functions is a subset of the set of the Cohen-Daubechies-Vial wavelets db3. Each function of the second set B2 of functions is associated to a weight W, which is equal to the inverse of the number of the tiles of the first set of tiles the support of said function overlaps.

The selection condition of each function of the second set B2 of functions comprises the requirement that at least an element of the comparison set SC1 is smaller than or equal to the given threshold value TV associated to said function of the second set B2 of functions. For each function of the second set B2 of functions, the comparison subset SC2 is the support of the function itself. Further, the threshold value TV of each function of the second set B2 of functions is computed by the threshold function FT defined in equation (XI) and is equal to the value of the threshold function FT at the value of the level parameter associated to the level, to which said function belongs.

In the first embodiment, the selection condition of each function of the second set B2 of functions comprises also two level requirements, which concern the level parameter associated to the level, to which said function belongs. The first level requirement is that the level parameter associated to the level of the first collection to which said function belongs is greater than or equal to a given level threshold T. The second level requirement, instead, is that the level parameter associated to the level of the first collection to which said function belongs is lower than or equal to the level bound U. The level associated to the level threshold T and the level associated to the level bound U are the so-called minimum level and maximum level, respectively.

The choice of the given level threshold T is in particular based on the balance of two competing objectives, namely the efficiency of the construction of the luminosity function and the efficient representation of regular sub-regions of the image. Therefore, the level threshold T is chosen by requiring that the projection onto the coordinate axis of the image plane of the functions of the first set of functions belonging to the level associated to the level threshold T cover at least a given fraction, e.g. 20%, of the area of the image plane. In particular, the level threshold T may be the level of the Cohen-Daubechies-Vial wavelets db3 associated to level parameter six.

The level bound U is computed in the first step 101 of the method according to the present invention. The computation of the level bound U depends on the desired image resolution. More specifically, the level bound U is equal to the integer part of $\log_2(\Gamma_{3,W}/A_{res})/2$. For instance, for a 1024× 1024 pixel image a suitable choice of the level bound U is the level of the Cohen-Daubechies-Vial wavelets db3 associated to the level parameter ten.

In the next step 102, an initial input subset SI is constructed by sampling the image plane according to an initial distribution criterion. The initial distribution criterion comprises at least the requirement that, for each tile of the first set of tiles, the number of points of the initial input set SI belonging to said tile is equal to the sum of a sixth total weight factor PW6. The sixth total weight factor PW6 is the sum of the weight factors W of the functions of the first set of functions, which: (i) belong to the minimum level (ii) have a support which overlaps said tile.

Moreover, an initial set of luminosity samples SLI is constructed by evaluating the luminosity at the points of the initial input subset SI.

In a subsequent step 103, for each level of a fourth collection a first embodiment of the second construction method M2 associated to said level (cf. FIG. 2) is performed and constructs a constructed set SF of functions and a constructed subset SP of points associated to said level. In particular, the constructed set SF of functions and the constructed subset SP of points associated to said level are the first and the second output of the second construction method M2 associated to said level, respectively.

In the current step 103, the second construction methods M2 are performed in ascending order of the level parameter associated to the level, to which said methods M2 are associated to. Therefore, the second construction methods M2 performed in the current step 103 are ordered according to their order of execution. The second construction method M2 associated to a first generic level immediately precedes the second construction method M2 associated to a second generic level if, in the fourth collection D4, the level parameter associated to the first generic level is immediately preceding the level parameter associated to the second generic level. Moreover, the second construction method M2 associated to the minimum level is the firstly-performed second construction method M2.

The fourth collection D4 of levels comprises only the levels which are associated to a level parameter lower than or equal to the level bound U and greater than or equal to the level threshold T. This allows for efficiently implementing the two requirements concerning the level parameter, since the execution of the second construction method M2 is restricted to the levels of the fourth collection D4.

Moreover, for each level of the fourth collection D4, the second construction method M2 associated to said level is also associated to a level-dependent subset of points of the image plane. The level-dependent subset associated to the firstly-performed second construction method M2 is the initial input subset SI constructed in the previous step 102. Moreover, the level-dependent subset associated to the second construction method M2 associated to a given level, comprises the constructed subset SP constructed in the immediately preceding second construction method M2 and the level-dependent subset associated to the immediately preceding second construction method M2.

In the next step 104, the first set B1 of functions is constructed by performing the union of the constructed sets SF of functions associated to the levels of the fourth collection D4, i.e. of the constructed sets SF of functions constructed in the previous step 103 of the first embodiment of the method.

The constructed subsets SP of points associated to the levels of the fourth collection D4 constitute the second collection D2 of the image plane. Each element of the second collection D2 is paired via the second one-to-one correspondence G with one level of the fourth collection D4, i.e. with each element of the first collection D1, which shares at least a function with the first set B1 of functions. More specifically, the second one-to-one correspondence associates to each level of the fourth collection D4 the constructed subsets SP associated to said level.

In the next step 105, the image plane I is tiled by the second set A2 of tiles. The tiles of the second set A2 of tiles are typically, but not necessarily, rectangular and provide a cover for the image plane I. Moreover, each tile of the second set A2 of tiles can be considered to be the region R according to the present invention.

Moreover, the information needed to describe each tile of the second set A2 of tiles is stored. The information needed to describe at least a tile of the second set A2 of tiles may be stored on a storage device, and/or according to a data storage model such as the Cloud storage or the Nearline storage model.

In a subsequent step 106, for each tile of the second set A2 of tiles a first embodiment of the fifth construction method M5 associated to said tile (cf. FIG. 3) is performed. The fifth construction method M5 associated to a tile of the second set A2 of tiles allows for constructing the luminosity function FL in said tile as equivalent to the third linear combination associated to said tile, wherein said third linear combination involves functions of the first set B1 of functions. Moreover, the fifth construction method M5 associated to a tile allows for storing the coefficients of the third linear combination associated to the tile and the information needed to associate each coefficient of said third linear combination to the corresponding function, wherein the corresponding function is the function multiplying said coefficient in the third linear combination associated to the tile.

Figure 2:
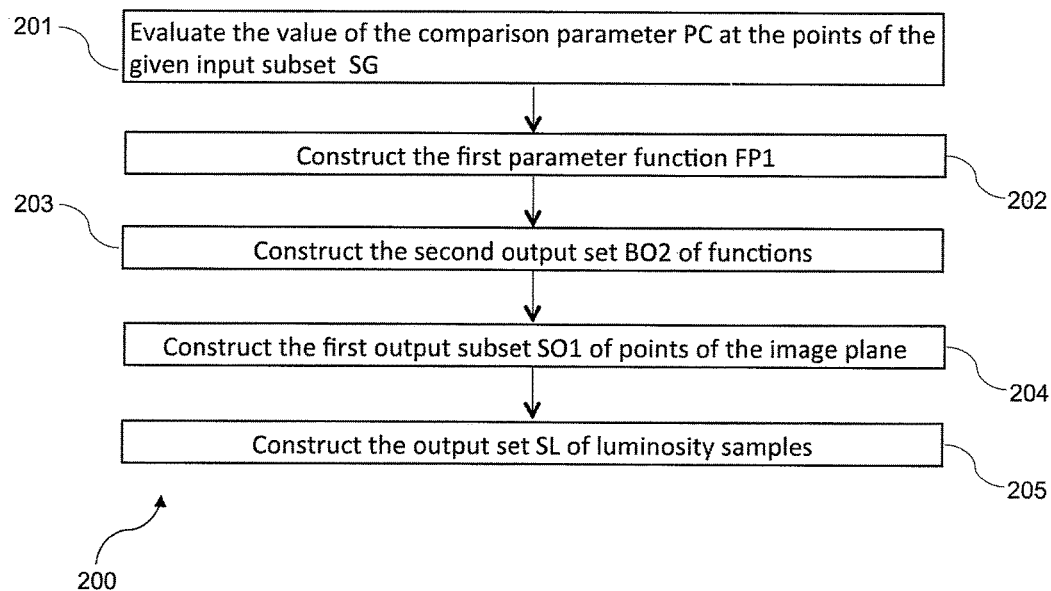
FIG. 2 is a flowchart 200 of a first embodiment of the second construction method M2.

FIG. 2 illustrates a flow chart 200 of the first embodiment of the second construction method M2 associated to a given level JG of the first collection and to a given input subset SG of points.

In the first step 201, the value of the comparison parameter PC in correspondence to the points of the given input subset SG is evaluated by using the Hölder function FH. In particular, the value of the comparison parameter PC does not need to be re-evaluated in correspondence to the points of the given input subset SG in which said parameter has been already evaluated. The value of the Hölder constant $\Gamma_H$ is determined by using a calibration procedure, e.g. by requiring that the computed values correspond to the expected ones.

The degree of the polynomial function $p_{H,u}$ of the Hölder function FH associated to the generic point of the image plane I with coordinates u, depends on whether the luminosity at said generic point is smooth according to the given smoothness criterion. If the luminosity is not smooth, the polynomial has degree zero and is given by $p_{H,u}(v)=l_u$. If the luminosity is smooth, the polynomial function $p_{H,u}$ has degree one and is given by $p_{H,u}(v)=l_u+d_u\cdot(v-u)$. The two-dimensional vector $d_u$ is a numerical approximation of the gradient of the functional expression of the luminosity in the image plane I, which is computed numerically by using finite differences as described above.

The smoothness criterion comprise the requirements of determining (i) at least a first ray impinging on a control point of the third surrounding set of said generic point; (ii) a second ray impinging on said generic point; and (iii) whether the first and the second ray intersect different connected components of the scene manifold. If the first and the second ray intersect different connected components of the scene manifold, the luminosity at said generic point is considered not smooth. If these rays intersect the same connected component of the scene manifold then the luminosity in the generic point is considered smooth. The first ray and/or the second ray are e.g. determined by using ray tracing and/or ray casting.

In a subsequent step 202, the first parameter function FP1 is computed by using the values of the comparison parameter computed in the previous step 201. Moreover, the first parameter function FP1 may be obtained by assigning to the generic point of the image plane I the value of the comparison parameter PC evaluated at the point of the given input subset SG which is closest to said generic point.

The second output set BO2 of functions is constructed in step 203 of the first embodiment of the second construction method M2. In particular, the second output set BO2 is constructed by selecting each function of the second set B2 of functions satisfying the selection condition associated to said function and such that said function belongs to the given level JG. In this case, the two level requirements are automatically satisfied.

In the next step 204, the first output subset SO1 of the image plane is constructed by sampling the image plane according to the fourth distribution criterion. The fourth distribution criterion comprises the requirement that for each tile of the first set of tiles the number of points of the first output subset SO1 belonging to said tile is equal to the fourth total weight factor PW4. Moreover, the fourth total weight factor is the sum of the weight factors W of the functions which: (i) belong to the second output set BO2 of functions, and (ii) have a support which overlaps said tile. Moreover, the first output set SO1 is constructed by using the first set of tiles and the third sampling procedure.

Finally, an output set SL of luminosity samples associated to the given level JG is constructed 205 by evaluating the luminosity at the points of the first output set SO1. For example, the luminosity is computed by using the first order solution of the rendering equation, which considers only the first bounce of the light between the light source and the image plane.

Figure 3:
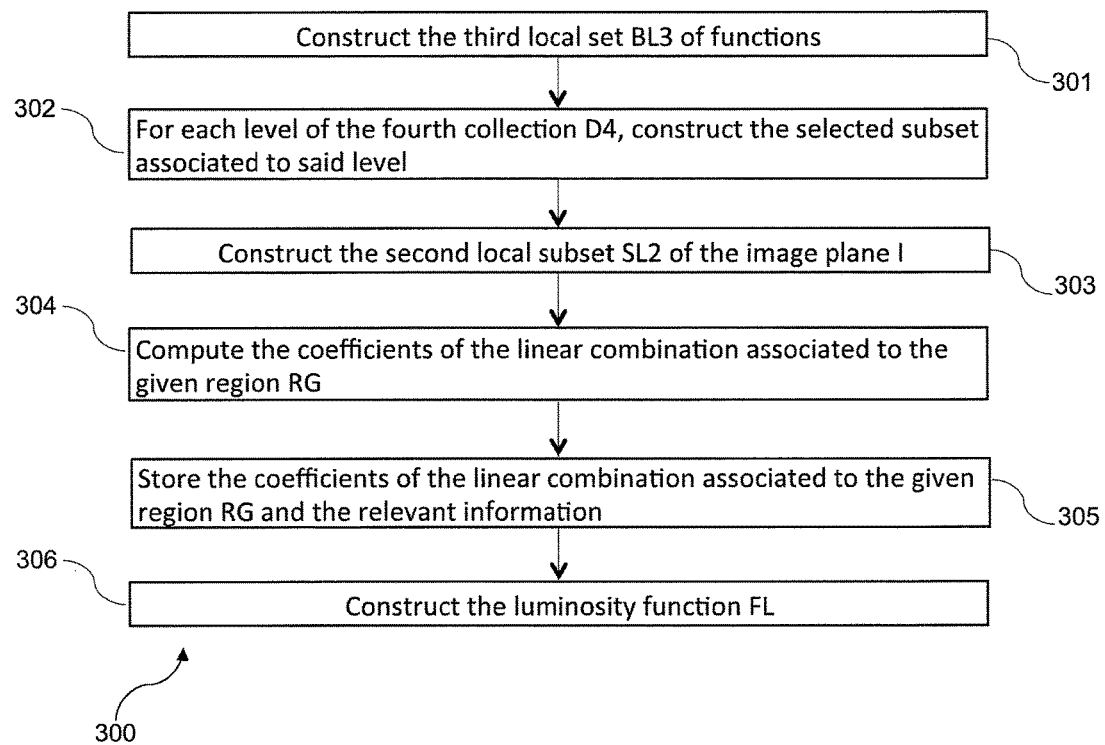
FIG. 3 is a flowchart 300 of a first embodiment of the fifth construction method M5.

FIG. 3 depicts a flow chart 300 of the first embodiment of the fifth construction method M5 associated to a given tile TG. The fifth construction method M5 comprises the step of constructing the third local set BL3 associated to the given tile TG (step 301). Said third local set BL3 of functions is constructed by selecting each function of the first set B1 of functions, such that the support of said function overlaps the given tile TG.

In a subsequent step 302, for each level of the fourth collection D4 the selected subset associated to said level is constructed by applying the fourth construction method M4 associated to said level and to the third local set BL3 associated to the given tile TG.

Subsequently, the second local subset SL2 of the image plane associated to the given tile TG is constructed in step 303. More specifically, said second local subset SL2 is constructed by performing the union of the selected subsets associated to the levels of the fourth collection D4, i.e. of the selected subsets constructed in the previous step 302.

In step 304, the second local subset SL2 associated to the given tile TG is used to compute the coefficients of the third linear combination associated to the given tile TG, which involves the functions of the third local set BL3 associated to the given tile TG. The value of the coefficients of said third linear combination is computed by solving the second linear system associated to the given tile TG.

In the first embodiment of the fifth construction method M5, the third linear combination associated to the given tile TG is equal to the fourth linear combination associated to the given tile TG and thus the second linear system associated to the given tile TG is obtained by imposing the value of the third linear combination associated to the given tile TG at each point of the second local subset SL2 associated to the given tile TG to be substantially equal to the value of the luminosity L at said point. The value of the luminosity L at the points of said second local subset SL2 has been evaluated in the step 102 and/or in the step 205, when evaluating the luminosity samples.

The linear system associated to the given tile TG may be solved by using a least squares fit, an interpolation fit, and/or a reproducing kernel technique. Said reproducing kernel technique is in particular performed with at least the third local set BL3 associated to the given tile TG, the second local subset SL2 associated to the given tile TG, and the value of the luminosity L evaluated at the points of said second local subset SL2.

In the next step 305, the coefficients of the third linear combination associated to the given tile TG, are stored, together with the information needed to associate each coefficient of said linear combination with the corresponding function of the first set B1 of functions, i.e. with the function multiplying said coefficient in the third linear combination associated to the given tile TG. The information needed to associate each coefficient of the third linear combination associated to the given tile TG to the given tile TG is stored as well.

Finally, the luminosity function FL in the given tile TG is constructed (step 306). In particular, said luminosity function FL is constructed as equivalent to the third linear combination associated to the given tile TG.

Figure 4:
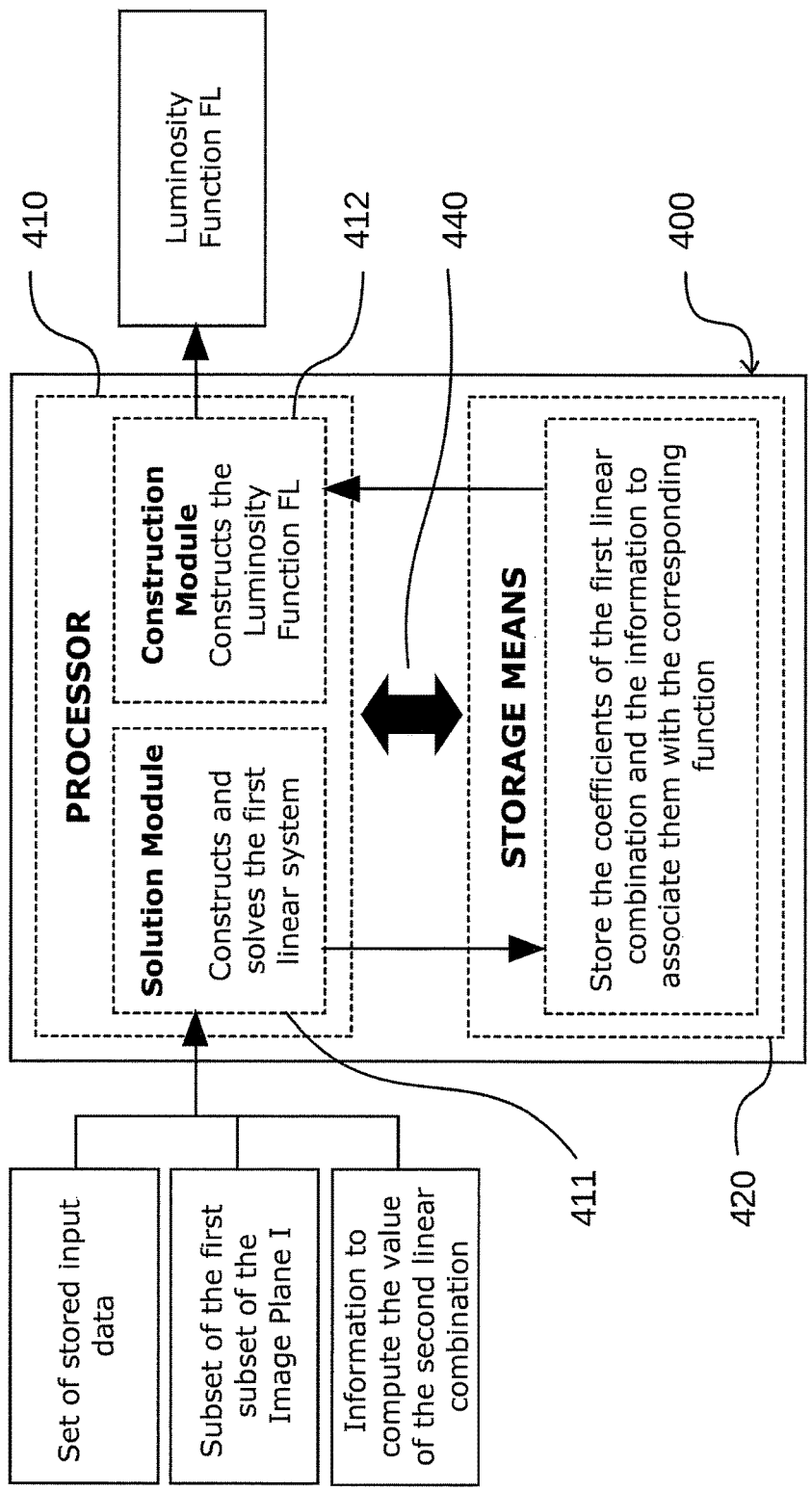
FIG. 4 is a schematic block diagram of a device according to the present invention.

In one construction according to the present invention, a device 400, FIG. 4, is configured for rendering at least partially an image of a three-dimensional scene on an image plane. The device 400 includes storage means 420, and a processor 410 connected to the storage means 420 as indicated by bi-directional arrow 440. Storage means 420 comprises non-transitory computer readable media. The processor 410 includes a solution module 411, which constructs and solves a first linear system as described above, and a construction module 412 which constructs a luminosity function FL such as described above. Solution module 411 and construction module 412 may be stored in and loaded into processor 410 from storage means 420. Device 400 can be programmed to implement the steps of the method according to any one of the embodiments described herein.

Although specific features of the present invention are shown in some drawings and not in others, this is for convenience only, as each feature may be combined with any or all of the other features in accordance with the invention. While there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature.

It is the intention, therefore, to be limited only as indicated by the scope of the claims appended hereto. Other embodiments will occur to those skilled in the art and are within the following claims.

What is claimed is:

1. A method for encoding at least partially an image of a three-dimensional scene on an image plane, wherein said method comprises:

constructing a luminosity function in at least a region of the image plane as equivalent to a first linear combination, wherein the first linear combination comprises terms and involves functions of at least a subset of a first set of functions defined on the image plane;

determining values of coefficients of the first linear combination by solving a first linear system, wherein the first linear system is obtained by imposing a value of a second linear combination at each point of at least a sub-subset of a first subset of the image plane to be equal to sampled values of luminosity at said point, wherein the second linear combination involves at least the terms of the first linear combination;

storing values of those coefficients of the second linear combination which are also comprised in the first linear combination and at least an information needed to associate each coefficient of the first linear combination to a corresponding function of the first set of functions, wherein the corresponding function of the first set of functions multiplies said each coefficient in the first linear combination; and encoding at least a luminosity of the image with the luminosity function;

wherein the first set of functions is at least a subset of a basis and/or frame of an inner product space and comprises each function that belongs to a second set of functions and satisfies a selection condition associated to said function, wherein the selection condition associated to said function depends at least on said function and on a set of stored input data, wherein the set of stored input data describes, at least in part, the three dimensional scene; wherein the first subset of the image plane comprises points and wherein the points of the first subset of the image plane are distributed according to a first distribution criterion, wherein the first distribution criterion depends on at least a location of support of at least some elements of the first set of functions on the image plane.

2. The method according to claim 1, wherein for at least a function of the second set of functions the selection condition associated to said function depends on a value of the luminosity at at least one point of the support of said function.

3. The method according to claim 1, wherein the image plane is tiled by a first set of tiles, wherein at least a first tile of the first set of tiles comprises a number of points of the first subset of the image plane, wherein the first set of functions comprises a number of functions support of which overlaps said tile, and wherein the first distribution criterion comprises at least a requirement that for at least the first tile of the first set of tiles the number of points of the first subset of the image plane depends on the number of functions of the first set of functions.

4. The method according to claim 3, wherein each function of the first set of functions is associated to a weight factor.

5. The method according to claim 4, wherein the first distribution criterion comprises at least one of the a requirement that the number of sample points of the first subset belonging to the first tile is greater than or equal to a first total weight factor and/or that the number of sample points is greater than or equal to the product between a first factor and the first total weight factor, wherein the first total weight factor is the sum of the weight factors of the functions of the first set of functions, support of which overlaps the first tile.

6. The method according to claim 1, wherein the sampled values of luminosity are determinable at each point of the image plane via a rendering equation based on at least a part of the set of stored input data describing at least partially the scene.

7. The method according to claim 1, wherein the second set of functions is at least a subset, in particular a finite subset, of the basis and/or frame of the inner product space, in particular of a Hilbert space, wherein said inner product space comprises functions defined on the image plane.

8. The method according to claim 7, wherein values of coefficients of the first linear combination are determined by means of a reproducing kernel technique.

9. The method according to claim 8, wherein the reproducing kernel technique is performed with respect to at least a first local set of functions of the first set of functions, at least points of a first local subset of the first subset of the image plane and at least the values of the luminosity at the points of the first local subset of the first subset of the image plane.

10. The method according to claim 7, wherein elements of the second set of functions are groupable into a first collection of mutually disjoint levels, wherein elements of a set of the first collection can be associated to a level parameter, and wherein there is at least a decreasing bound function of the level parameter, wherein for at least a function of the second set of functions an absolute value of a scalar product between the luminosity function and said function of the second set of functions is smaller than or equal to a value of the decreasing bound function evaluated at a value of the level parameter associated to the level, to which said function of the second set of functions belongs.

11. The method according to claim 1, wherein at least the selection condition associated to a first function of the second set of functions comprises at least a requirement that at least an element of a comparison set is smaller than or equal to a given threshold value associated to the first function of the second set of functions, wherein the comparison set comprises at least values of a first parameter function at at least a comparison subset of points of support of the first function, wherein the first parameter function is defined on the image plane and describes variation of a value of a comparison parameter in the image plane.

12. The method according to claim 11 further comprising determining the first parameter function using values of the comparison parameter evaluated at points of a second subset of the image plane, wherein values of the comparison parameter at each point of the image plane are obtained using a second parameter function.

13. The method according to claim 12, wherein the second parameter function is a Holder function.

14. The method according to claim 12, wherein the subset of the first set of functions is a first subset of the first set of functions and wherein the sub-subset of the first subset of the image plane is a first sub-subset of the first subset of the image plane, and wherein at least a second subset of the first set of functions and a second sub-subset of the first subset of the image plane are set to be respectively first and second output of a second construction method associated to a second level of the first collection and to a first input subset of the image plane, wherein the second construction method associated to a level of the first collection and to an input subset of points of the image plane uses the input subset to obtain a first output and a second output, wherein the first output is a second output set of functions and the second output is a first output subset of the image plane, and wherein the second construction method comprises at least the steps of:
constructing the first parameter function by using at least values of the comparison parameter evaluated at the points of the input subset and by using the second parameter function;
constructing the second output set of functions by selecting each function of the second set of functions satisfying the selection condition associated to said function and such that said function belongs to the level;
constructing the first output subset (SO1) by sampling the image plane according to a fourth distribution criterion, wherein the fourth distribution criterion depends on at least a location of support of elements of the second output set of functions on the image plane.

15. The method according to claim 11, wherein for at least a decreasing threshold function of the level parameter the threshold value of the first function is the value of said threshold function evaluated at the value of the level parameter associated to the level, to which said function belongs.

16. The method according to claim 1, wherein the image plane is tiled by a second set of tiles comprising the region as a tile, and wherein said method further comprises storing information needed to describe each tile of at least a first plurality of tiles of the second set of tiles.

17. The method according to claim 1, wherein the basis and/or frame is selected from a list comprising a set of wavelets, a set of shearlets, a set of curvelets, or combinations thereof.

18. The method according to claim 1, wherein the sampled values of luminosity are determined according to the set of stored input data and at least one of ray tracing or ray casting and wherein the set of stored input data comprises at least a specification of a geometry, a texture, a shading property, and a lighting of the three-dimensional scene.

19. A device rendering at least partially an image of a three-dimensional scene on an image plane (I), said device including computer storage, and a processor connected to said computer storage, said processor being programmed to: construct a luminosity function in at least a region of the image plane as equivalent to a first linear combination, wherein the first linear combination comprises terms and involves functions of at least a subset of a first set of functions defined on the image plane; determining values of coefficients of the first linear combination by solving a first linear system, wherein the first linear system is obtained by imposing a value of a second linear combination at each point of at least a sub-subset of a first subset of the image plane to be equal to sampled values of luminosity at said point, wherein the second linear combination involves at least the terms of the first linear combination; store values of those coefficients of the second linear combination which are also comprised in the first linear combination and at least an information needed to associate each coefficient of the first linear combination to a corresponding function of the first set of functions, wherein the corresponding function of the first set of functions multiplies said each coefficient in the first linear combination; and encode at least a luminosity of the image with the luminosity function; wherein the first set of functions is at least a subset of a basis and/or frame of an inner product space and comprises each function that belongs to a second set of functions and satisfies a selection condition associated to said function, wherein the selection condition associated to said function depends at least on said function and on a set of stored input data, wherein the set of stored input data describes, at least in part, the three dimensional scene; wherein the first subset of the image plane comprises points and wherein the points of the first subset of the image plane are distributed according to a first distribution criterion, wherein the first distribution criterion depends on at least a location of support of at least some elements of the first set of functions on the image plane.

20. One or more non-transitory computer-readable media comprising instructions that cause a computer device, in response to execution of the instructions by a processor of the computer device, to: construct a luminosity function in at least a region of the image plane as equivalent to a first linear combination, wherein the first linear combination comprises terms and involves functions of at least a subset of a first set of functions defined on the image plane; determining values of coefficients of the first linear combination by solving a first linear system, wherein the first linear system is obtained by imposing a value of a second linear combination at each point of at least a sub-subset of a first subset of the image plane to be equal to sampled values of luminosity at said point, wherein the second linear combination involves at least the terms of the first linear combination; store values of those coefficients of the second linear combination which are also comprised in the first linear combination and at least an information needed to associate each coefficient of the first linear combination to a corresponding function of the first set of functions, wherein the corresponding function of the first set of functions multiplies said each coefficient in the first linear combination; and encode at least a luminosity of the image with the luminosity function; wherein the first set of functions is at least a subset of a basis and/or frame of an inner product space and comprises each function that belongs to a second set of functions and satisfies a selection condition associated to said function, wherein the selection condition associated to said function depends at least on said function and on a set of stored input data, wherein the set of stored input data describes, at least in part, the three dimensional scene; wherein the first subset of the image plane comprises points and wherein the points of the first subset of the image plane are distributed according to a first distribution criterion, wherein the first distribution criterion depends on at least a location of support of at least some elements of the first set of functions on the image plane.

* * * * *